(12) United States Patent
Moorhouse et al.

(10) Patent No.: US 10,189,917 B2
(45) Date of Patent: Jan. 29, 2019

(54) FLUORINATED CATALYST SUPPORTS AND CATALYST SYSTEMS

(71) Applicant: Univation Technologies, LLC, Houston, TX (US)

(72) Inventors: John H. Moorhouse, Middlesex, NJ (US); Kevin J. Cann, Tierra Verde, FL (US); Phuong A. Cao, Old Bridge, NJ (US); Mark G. Goode, S. Charleston, WV (US); C. Jeff Harlan, Houston, TX (US); Wesley R. Mariott, Freeport, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 15/504,353

(22) PCT Filed: Aug. 19, 2014

(86) PCT No.: PCT/US2014/051695
§ 371 (c)(1),
(2) Date: Feb. 16, 2017

(87) PCT Pub. No.: WO2016/028276
PCT Pub. Date: Feb. 25, 2016

(65) Prior Publication Data
US 2017/0233506 A1  Aug. 17, 2017

(51) Int. Cl.
*B01J 8/24* (2006.01)
*B01J 21/04* (2006.01)
(Continued)

(52) U.S. Cl.
CPC .............. *C08F 10/02* (2013.01); *B01J 21/12* (2013.01); *B01J 27/135* (2013.01); *B01J 32/00* (2013.01);
(Continued)

(58) Field of Classification Search
CPC ........ B01J 8/082; B01J 8/1809; B01J 8/1872; B01J 8/24; B01J 21/04; B01J 21/08;
(Continued)

(56) References Cited

U.S. PATENT DOCUMENTS 4,255,542 A * 3/1981 Brown ................... B01J 8/1836
526/106
6,300,271 B1 * 10/2001 McDaniel .............. B01J 27/053
502/102

(Continued)

FOREIGN PATENT DOCUMENTS

JP  2003105029  4/2003
JP  2009126902  6/2009

(Continued)

OTHER PUBLICATIONS

International Search Report & Written Opinion for related PCT Application PCT/US2014/051695, dated May 22, 2015 (13 pgs).

(Continued)

*Primary Examiner* — Patricia L. Hailey
(74) *Attorney, Agent, or Firm* — Brooks, Cameron & Huebsch, PLLC

(57) ABSTRACT

Catalyst systems and methods for making and using the same. A method for making a catalyst support includes forming a mixture of a support material and a fluoride donor. The mixture is added to a fluidized bed reactor. The mixture is fluidized to form a fluidized bed with a height to diameter ratio of at least about 2.3. The mixture is calcined to decompose the fluoride donor, forming a fluorinated support.

9 Claims, 10 Drawing Sheets

(51) Int. Cl.
| | |
|---|---|
| *B01J 21/08* | (2006.01) |
| *B01J 27/12* | (2006.01) |
| *B01J 31/12* | (2006.01) |
| *C08F 10/02* | (2006.01) |
| *B01J 37/04* | (2006.01) |
| *B01J 37/08* | (2006.01) |
| *B01J 37/26* | (2006.01) |
| *B01J 21/12* | (2006.01) |
| *B01J 27/135* | (2006.01) |
| *B01J 32/00* | (2006.01) |
| *B01J 35/00* | (2006.01) |
| *B01J 37/00* | (2006.01) |
| *B01J 37/02* | (2006.01) |
| *C08F 4/00* | (2006.01) |
| *C08F 10/00* | (2006.01) |

(52) U.S. Cl.
CPC ......... *B01J 35/002* (2013.01); *B01J 37/0036* (2013.01); *B01J 37/0201* (2013.01); *B01J 37/04* (2013.01); *B01J 37/082* (2013.01); *B01J 37/26* (2013.01); *C08F 4/00* (2013.01); *C08F 10/00* (2013.01)

(58) Field of Classification Search
CPC ... B01J 21/12; B01J 27/12; B01J 31/12; B01J 2219/00164; B01J 2219/00182
USPC .......... 502/150, 224, 227, 228, 439
See application file for complete search history.

(56) References Cited

U.S. PATENT DOCUMENTS

| | | | | |
|---|---|---|---|---|
| 7,501,372 | B2* | 3/2009 | Thorn | C08F 10/02 502/119 |
| 7,884,163 | B2* | 2/2011 | McDaniel | C08F 10/02 502/103 |
| 8,012,900 | B2* | 9/2011 | Murray | C07F 17/00 502/102 |
| 2002/0169261 | A1 | 11/2002 | Speca et al. | |
| 2004/0048990 | A1 | 3/2004 | Brinen et al. | |
| 2004/0176242 | A1 | 9/2004 | Ishihama et al. | |
| 2006/0234856 | A1* | 10/2006 | Masino | C08F 10/00 502/103 |
| 2006/0234857 | A1* | 10/2006 | Jayaratne | C08F 10/00 502/103 |
| 2008/0058199 | A1 | 3/2008 | McDaniel et al. | |
| 2009/0240010 | A1 | 9/2009 | McDaniel et al. | |
| 2010/0076167 | A1 | 3/2010 | McDaniel et al. | |
| 2010/0317904 | A1 | 12/2010 | Small et al. | |
| 2011/0294969 | A1 | 12/2011 | Schmitz et al. | |
| 2012/0010375 | A1 | 1/2012 | Yang et al. | |
| 2012/0059134 | A1 | 3/2012 | Yang et al. | |
| 2012/0095174 | A1 | 4/2012 | Marin et al. | |
| 2012/0283400 | A1 | 11/2012 | Mihan et al. | |
| 2013/0072652 | A1 | 3/2013 | Fantinel et al. | |
| 2014/0058054 | A1 | 2/2014 | McDaniel et al. | |
| 2015/0191554 | A1* | 7/2015 | McDaniel | C08F 10/02 526/90 |
| 2017/0247482 | A1* | 8/2017 | Moorhouse | C08F 10/02 |
| 2017/0260306 | A1* | 9/2017 | Moorhouse | C08F 210/16 |

FOREIGN PATENT DOCUMENTS

| | | |
|---|---|---|
| WO | 9903897 | 1/1999 |
| WO | 0109200 | 2/2001 |
| WO | 2013028283 | 2/2013 |

OTHER PUBLICATIONS

2nd Written Opinion for related PCT Application PCT/US2014/051695, dated Sep. 13, 2016 (8 pgs).
International Preliminary Report on Patentability for related PCT Application PCT/US2014/051695, dated Nov. 16, 2016 (24 pgs).

\* cited by examiner

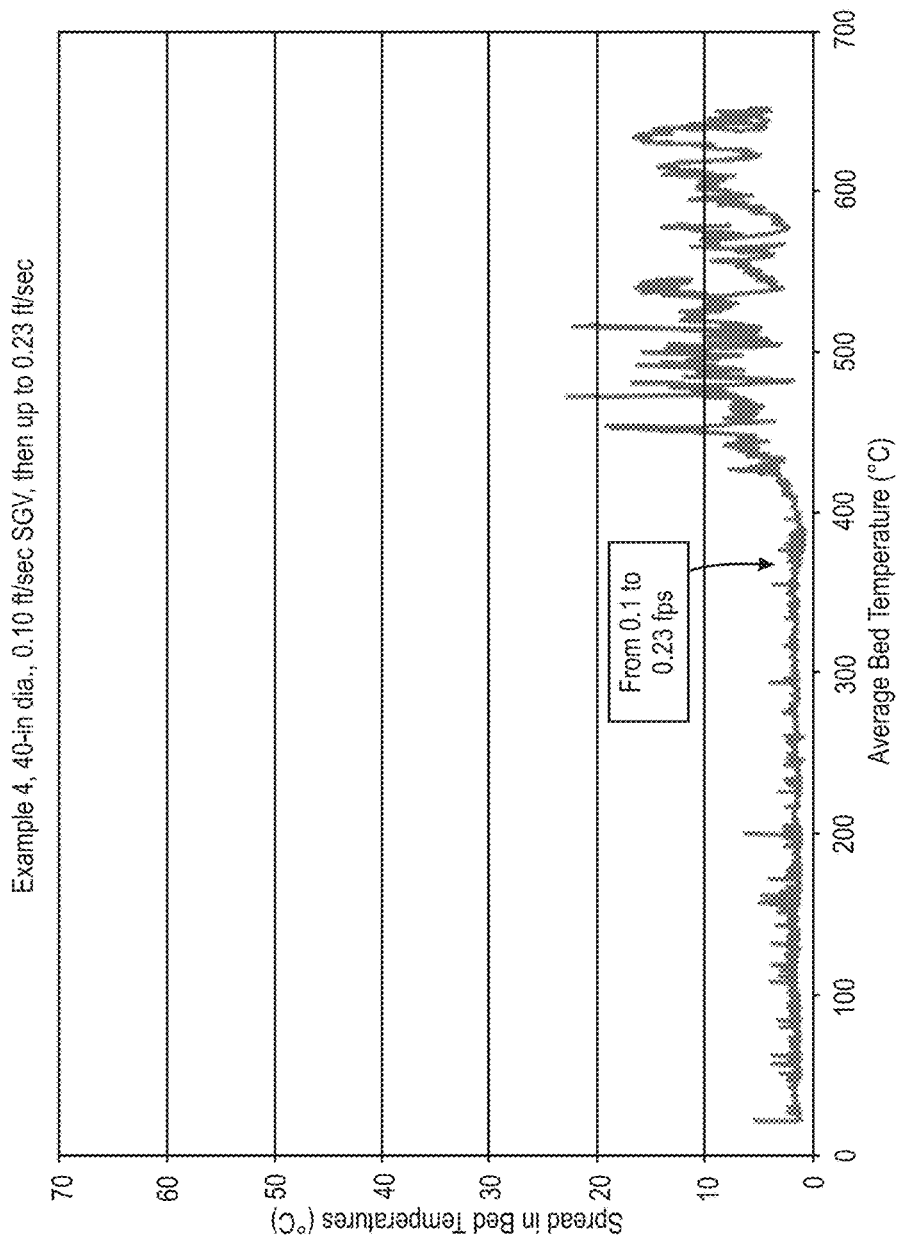

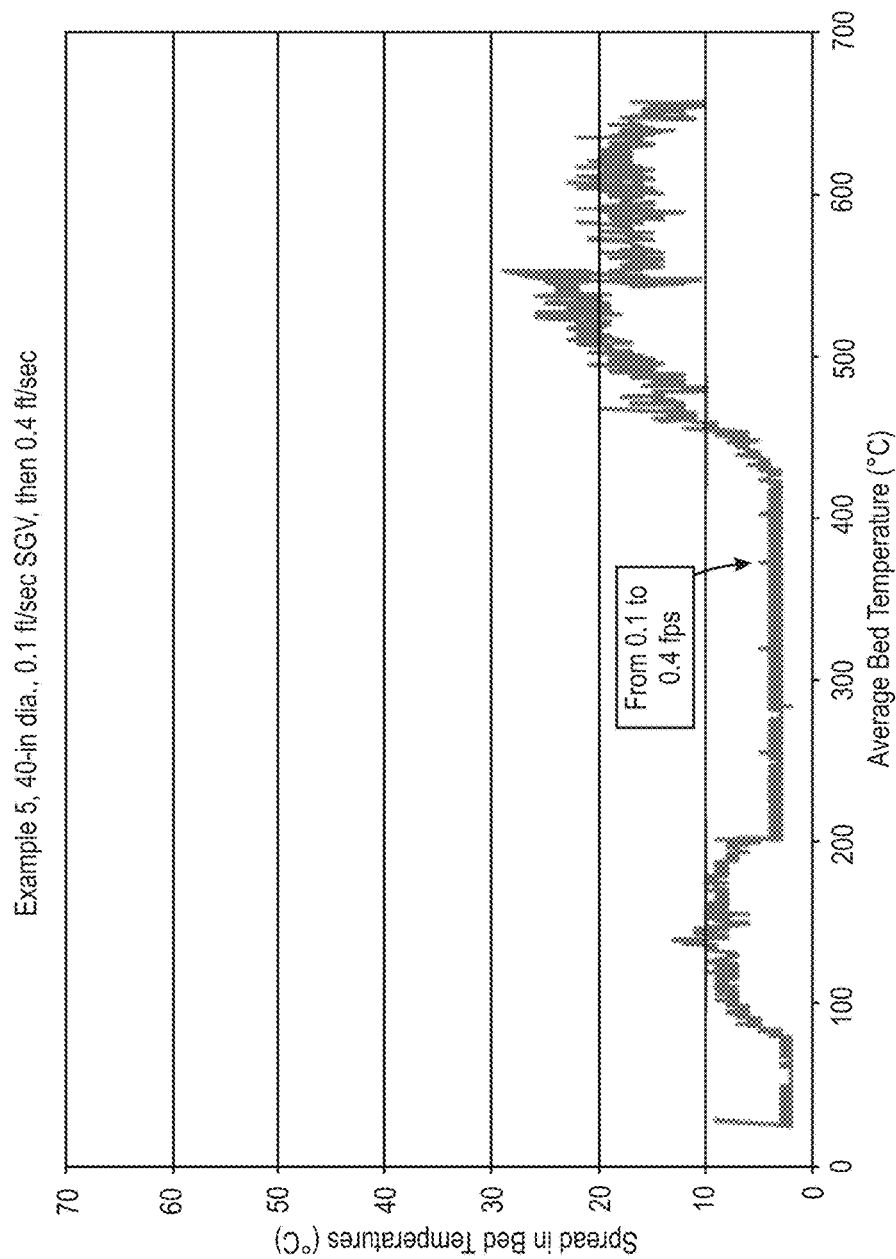

FLUORINATED CATALYST SUPPORTS AND CATALYST SYSTEMS

This application is a National Stage Application under 35 U.S.C. § 371 of International Application Number PCT/US2014/051695, filed Aug. 19, 2014 and published as WO 2016/028276 on Feb. 25, 2016, the entire contents of which are incorporated herein by reference in its entirety.

BACKGROUND

A number of catalyst compositions containing single site catalysts have been used to prepare polyolefins, producing relatively homogeneous copolymers at good polymerization rates. In contrast to traditional Ziegler-Natta catalyst compositions, single site catalyst compositions, such as metallocene catalysts, are catalytic compounds in which each catalyst particle contains one or only a few types of polymerization sites.

To achieve acceptable and economically viable polymerization activities with single site catalyst systems, a large amount of activator such as methylaluminoxane ("MAO") is often required. Such activators are often expensive and the large amount of activator required to produce an active single site catalyst for polymerization has been a substantial impediment to the commercialization of single site catalysts for polyolefin production.

SUMMARY

An exemplary embodiment described herein provides a method for making a catalyst support. The method includes forming a mixture of a support material and a fluoride donor. The mixture is added to a fluidized bed reactor. The mixture is fluidized to form a fluidized bed with a height to diameter ratio of at least about 2.3. The mixture is calcined to decompose the fluoride donor, forming a fluorinated support.

Another exemplary embodiment described herein provides a catalyst system. The catalyst system includes a catalyst compound, a fluorinated support, and an aluminoxane compound. The fluorinated support is generated by heating a catalyst support and a fluoride donor compound at a temperature sufficient to decompose the fluoride donor compound in a fluidized bed reactor with a height to depth ratio of a fluidized bed of at least about 2.3. The aluminoxane is present in an amount of about 10 mmol or less per gram of the support.

DESCRIPTION OF THE DRAWINGS

The advantages of the present techniques are better understood by referring to the following detailed description and the attached drawings, in which:

FIG. 9, labeled Example 4, is a plot of bed temperature spread which was measured in a 40-inch diameter fluidized bed activator that utilized 0.10 ft./sec fluidization gas velocity SGV in the early part of the run, then up to 0.23 ft./sec. SGV; and FIG. 10, labeled Example 5, is a plot of bed temperature spread which was measured in a 40-inch diameter fluidized bed activator that utilized 0.10 ft./sec fluidization gas velocity SGV in the early part of the run, then up to 0.40 ft./sec. SGV.

Figure 1:
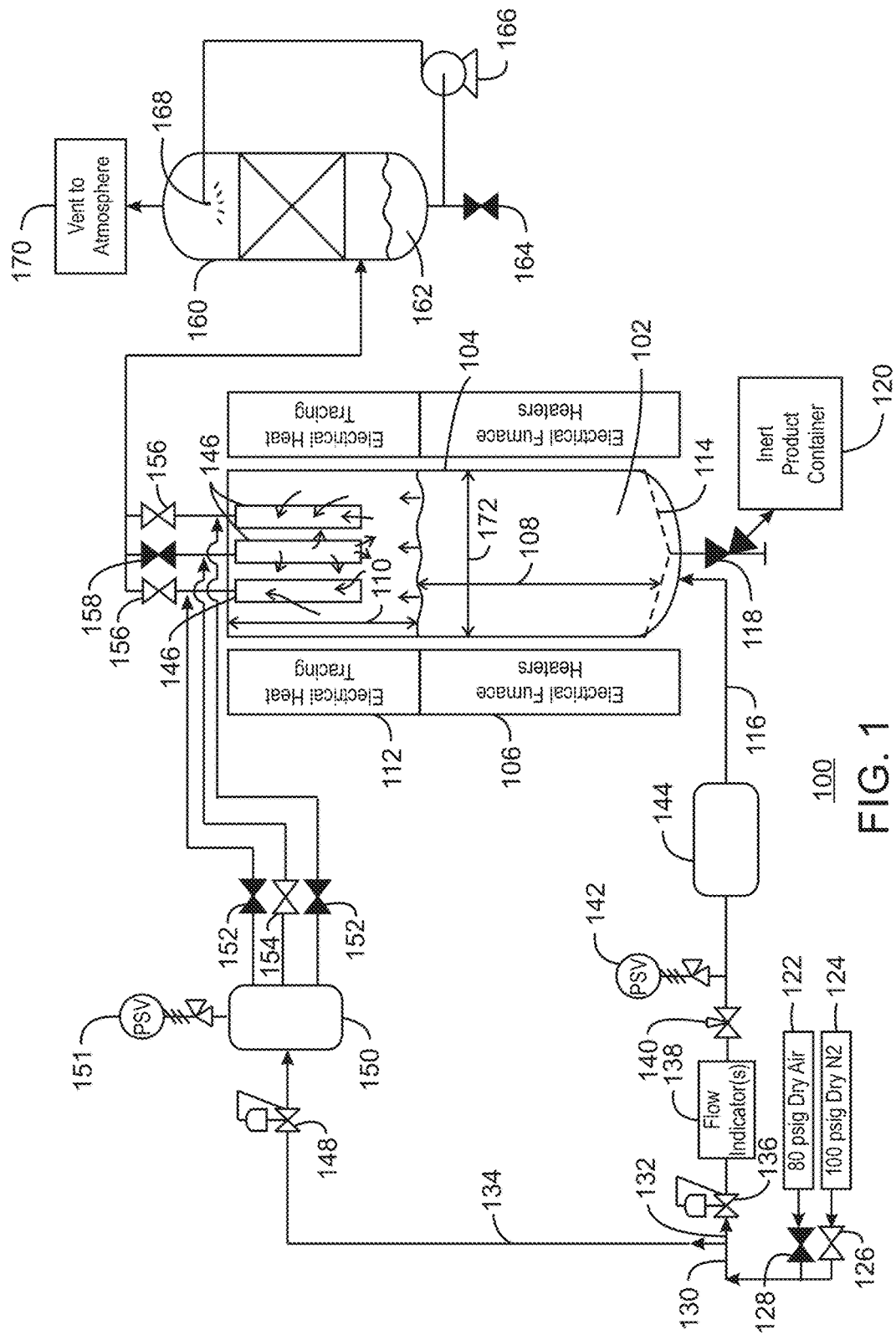
FIG. 1 is a simplified process flow diagram of a catalyst activator system that may be used in embodiments.
Figure 2:
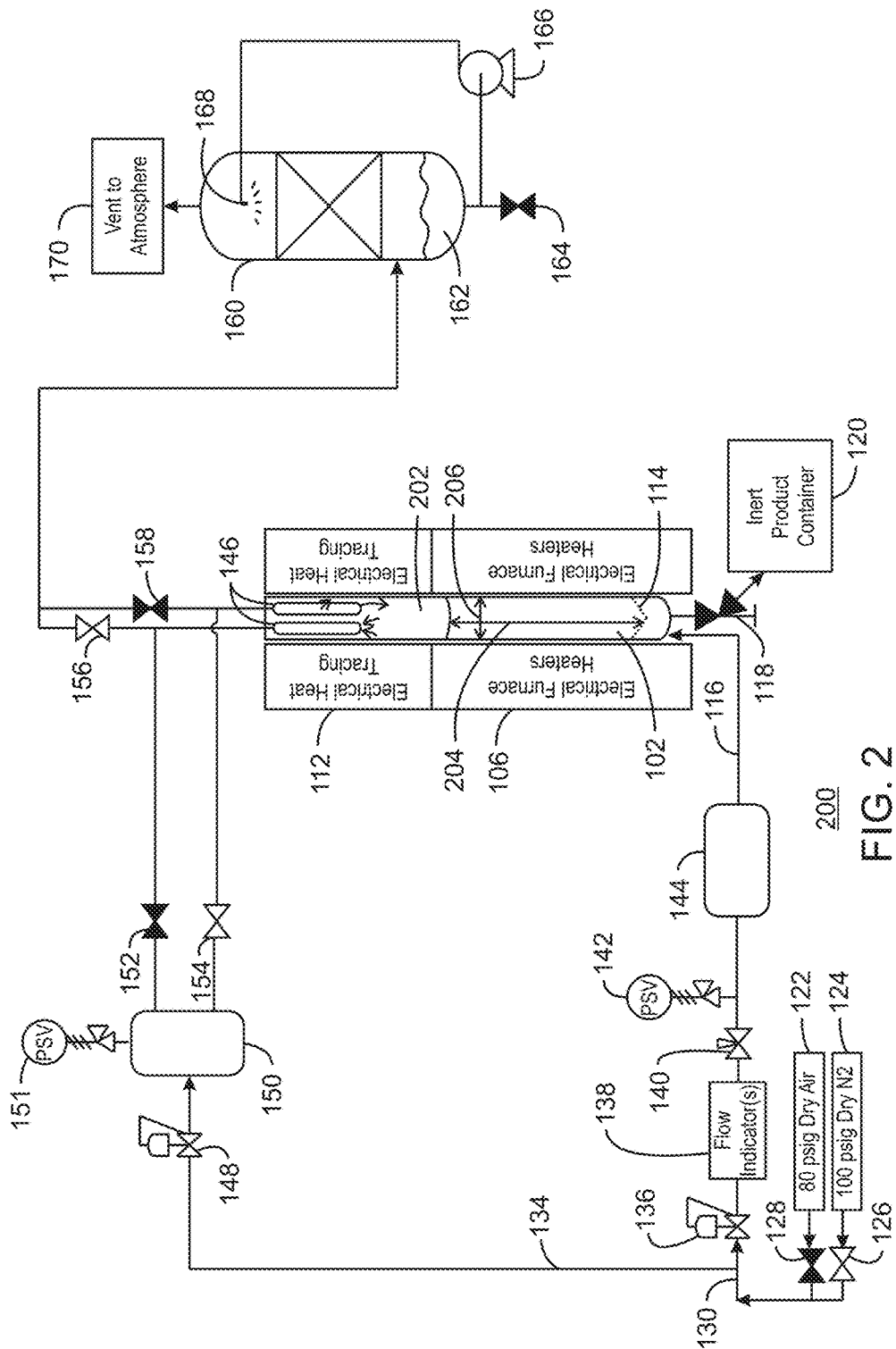
FIG. 2 is a simplified process flow diagram of another catalyst activator that may be used in embodiments.

For simplicity and clarity of illustration, elements shown in FIGS. 1 and 2 have not necessarily been drawn to scale. For example, the dimensions of some of the elements may be exaggerated relative to other elements for clarity. Further, where considered appropriate, reference numerals may be repeated among the drawings to indicate corresponding or analogous elements.

DETAILED DESCRIPTION

It has been discovered that when an alumina-containing support has been fluorinated, a high level of catalyst productivity is obtained by increasing a concentration of the transition metal component in the single site catalyst compound. The catalyst system can include an activator, e.g., one or more aluminoxanes, in an amount of about 10 mmol or less per gram of support. It has also been discovered that a high level of catalyst productivity is obtained using a small amount of activator, i.e., about 4 mmol or less per gram of support, when the support is an alumina-containing support that has been fluorinated.

However, scaling up the production of the fluorinated alumina has resulted in problems with flow, plugging of filters, and the formation of rubble and chips. Therefore, there is a need for large scale production procedures that do not plug filters during production procedures. Activation procedures, including temperature profile and gas velocities, have been identified that decrease vent filter plugging and lower the probability of the system from becoming segregated due to the large differences in the fluidization characteristics of the support and the fluorinating agent.

However, recent scale-up of fluorinated alumina supports by calcinations of alumina-silica supports with a fluoride source such as ammonium hexafluorosilicate (herein termed AHF) have also led to significant chip and rubble formation. The chips contain a high level of fluoride and cause difficulty in transporting the final material, for example, removing the material from the fluidized bed reactor. In addition, it is believed the chip formation contributes to lower than expected F levels in the bulk of the final product.

Several approaches have been identified that are expected to reduce chip formation. These include the design and configuration of the reactor. Other approaches include impregnation of the AHF into the pores of the support which should lead to more uniform distribution of the AHF. The AHF may also be pre mixed with the support prior to addition to the activator. In some embodiments, the fluorination may be performed in steps. For example half the AHF can be added and calcined with the support, followed by addition of the remaining AHF and then a second calcination. In addition to these procedures, a smaller size AHF particles can be used in the activation.

Overview of the Polymerization System

As an initial matter, it may be noted that any number of catalyst systems can be used with embodiments of the current systems. For example, techniques described herein often refer to single site catalysts, however, these techniques are applicable to any number of discrete cationic organometallic catalyst compounds, including both metallocene catalysts and non-metallocene catalysts. Some are single site catalysts, while others have dual sites or multiple sites. This can include, for example, single site metallocene compounds such as bis(n-butyl, methyl cyclopentadienyl) zirconium $Cl_2$, dual site metallocene compounds, such as bis(n-propylcyclopentadienyl) hafnium $(CH_3)_2$, and non-metallocene catalysts, such as $[(2, 3, 4, 5, 6\ Me_5C_6N)CH_2CH_2]_2$ $NHZ\text{-}rBn_2$. Accordingly, any reference to single site catalysts are not limited to those types of catalysts, but may include any number of others, as described herein.

If a single site catalyst is used with the fluorinated support, the transition metal component of the single site catalyst compound can be present in an amount ranging from a low of about 0.2 wt. %, about 0.5 wt. %, or about 0.7 wt. % to a high of about 1 wt. %, about 2 wt. %, about 2.5 wt. %, about 3 wt. %, about 3.5 wt. %, or about 4 wt. %, based on the total weight of the catalyst system. Depending, at least in part, on the particular transition metal components the amount of the transition metal component of the single site catalyst can vary. For example, if the transition metal component is Hf, the transition metal component can be present in the single site catalyst compound in an amount of about 0.6 wt. % or more, about 0.7 wt. % or more, about 0.8 wt. % or more, about 0.85 wt. % or more, about 0.9 wt. % or more, about 0.95 wt. % or more, about 1 wt. % or more, about 1.05 wt. % or more, about 1.1 wt. % or more, about 1.15 wt. % or more, about 1.2 wt. % or more, about 1.25 wt. % or more, or about 1.3 wt. % or more, based on the total weight of the catalyst system. In another example, if the transition metal component is Zr, the transition metal component can be present in the single site catalyst compound in an amount ranging from a low of about 0.2 wt. %, about 0.25 wt. %, about 0.3 wt. %, or about 0.35 wt. % to a high of about 0.4 wt. %, about 0.8 wt. %, about 1 wt. %, about 1.2 wt. %, or about 1.5 wt. %, based on the total weight of the catalyst system. For the purposes of this disclosure, the term "catalyst system" collectively refers to the one or more single site catalyst compounds, activators, and supports.

When the support is a fluorinated alumina-containing support, increasing the amount of the transition metal component of the single site catalyst compound increases the catalyst productivity. As such, using a fluorinated alumina-containing support allows for increasing the catalyst productivity by increasing the concentration of the transition metal component of the single site catalyst compound. For example, when using a fluorinated support, the catalyst productivity of the catalyst system can be increased by about 50%, about 60%, about 70%, about 80%, about 90%, about 100%, about 110%, about 120%, about 130%, or more by increasing the amount of the transition metal component of the single site catalyst compound, as compared to the same catalyst system using a non-fluorinated alumina-containing support and a lower concentration of the transition metal component of the single site catalyst system. In other words, for two similar catalyst systems, e.g., substantially similar activator concentrations, both including the same fluorinated alumina-containing support, and the same single site catalyst compound, the catalyst productivity can be increased by increasing the amount of the transition metal component of the single site catalyst compound.

The single site catalyst compound, the activator, and the support can be combined together in any order or sequence to produce the catalyst system. The order or sequence of the catalyst system preparation has negligible or no effect on the catalyst productivity. For example, the one or more single site catalyst compounds and activators can be combined to produce a catalyst/activator mixture, and the support and the catalyst/activator mixture can then be added independently to a polymerization reactor. The support, single site catalyst compound, and activator can be combined and introduced as a single catalyst system to the polymerization reactor. Alternatively, the single site catalyst compound and activator can be combined first to produce a catalyst/activator mixture and then the support can be added to the catalyst/activator mixture to produce the catalyst system. Alternatively, the single site catalyst compound and activator can be combined to produce a catalyst/activator mixture and then the catalyst/activator mixture can be added to the support to produce the catalyst system. Alternatively, the support and activator can be combined first to produce an activator/support mixture and then the single site catalyst compound can be added to activator/support mixture to produce the catalyst system. The single site catalyst compound can be added to the activator/support mixture before introduction to the polymerization reactor or the single site catalyst compound and the activator/support mixture can be independently introduced to the polymerization reactor and combined therein.

One or more diluents or carriers can be used to facilitate the combination of any two or more components of the catalyst system. For example, the single site catalyst compound and the activator can be combined together in the presence of toluene or another non-reactive hydrocarbon or hydrocarbon mixture to provide the catalyst/activator mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the catalyst/activator mixture or the catalyst/activator mixture can be added to the support.

The activator can be an aluminoxane, such as methylaluminoxane ("MAO"), modified methylaluminoxane ("MMAO"), or a combination thereof. The amount of aluminoxane can be determined based on the amount of aluminum (Al) contained in the aluminoxane. The aluminoxane can be present in the catalyst system in an amount ranging from a low of about 0.1 mmol to about 10 mmol per gram of support.

Support

As used herein, the terms "support" and "carrier" are used interchangeably and refer to any support material, including a porous support material, such as talc, inorganic oxides, and inorganic chlorides. Other inorganic materials that can be fluorinated may be used as the supports.

The one or more single site catalyst compounds can be supported on the same or separate supports together with the activator, or the activator can be used in an unsupported form, or can be deposited on a support different from the single site catalyst compounds, or any combination thereof. This may be accomplished by any technique commonly used in the art. There are various other methods in the art for supporting a single site catalyst compound. For example, the single site catalyst compound can contain a polymer bound ligand as described in, for example, U.S. Pat. Nos. 5,473,202, and 5,770,755. The single site catalyst compounds can be spray dried as described in, for example, U.S. Pat. No. 5,648,310. The support used with the single site catalyst compound can be functionalized, as described in EP 0 802 203, or at least one substituent or leaving group is selected as described in U.S. Pat. No. 5,688,880.

The support can be or include one or more inorganic oxides. The support can be an inorganic oxide that includes one or more metal oxides of Group 2, 3, 4, 5, 13, or 14 elements. For example, the inorganic oxide can include, but is not limited to, alumina, silica, titania, zirconia, boria, zinc oxide, magnesia, or any combination thereof. Illustrative combinations of inorganic oxides can include, but are not limited to, alumina-silica, silica-titania, alumina-silica-titania, alumina-zirconia, alumina-titania, and the like. The support can be or include alumina, silica, or a combination thereof.

Supports that include two or more inorganic oxides having any ratio or amount of each oxide, relative to one another, can be used. For example, an alumina-silica catalyst support can include from about 1 wt. % alumina to about 99 wt. % alumina, based on the total amount of alumina and silica. In one or more embodiments, an alumina-silica catalyst support can have an alumina concentration ranging from a low of about 2 wt. %, about 5 wt. %, about 15 wt. %, or about 25 wt. % to a high of about 50 wt. %, about 60 wt. %, about 70 wt. %, or about 90 wt. %, based on the total amount of alumina and silica. For example, the alumina concentration of the alumina-silica catalyst support can be about 20 wt. %, about 25 wt. %, about 30 wt. %, about 35 wt. %, about 40 wt. %, about 45 wt. %, about 50 wt. %, about 55 wt. %, about 60 wt. %, about 70 wt. %, about 80 wt. %, or about 90 wt. %. In another example, the aluminum concentration of the support can range from a low of about 2 wt. %, about 3 wt. %, about 4 wt. % or about 5 wt. % to a high of about 10 wt. %, about 20 wt. %, about 30 wt. %, about 40 wt. %, or about 45 wt. %, based on a weight of the support. In another example, the aluminum concentration of the support can range from about 2 wt. % to about 12 wt. %, about 3 wt. % to about 10 wt. %, about 4 wt. % to about 8 wt. % or about 3 wt. % to about 7 wt. %, based on the weight of the support. In another example, the aluminum concentration of the support can range from a low of about 20 wt. %, about 23 wt. %, or about 25 wt. % to a high of about 35 wt. %, about 40 wt. %, or about 45 wt. %, based on the weight of the support.

Suitable commercially available silica supports can include, but are not limited to, ES757, ES70, and ES70W available from PQ Corporation. Suitable commercially available silica-alumina supports can include, but are not limited to, ES757, ES70, and ES70W each with an aluminum compound added in an amount to give about 2 to about 10 wt. % Al, available from PQ Corporation; and SIRAL® 1, SIRAL® 5, SIRAL® 10, SIRAL® 20, SIRAL® 28M, SIRAL® 30, SIRAL® 40, and SIRALOX® 40/480, available from SASOL®.

A mixed inorganic oxide catalyst support can be prepared using any suitable method. For example, a silica catalyst support can be mixed, blended, contacted, or otherwise combined with one or more aluminum compounds to produce a silica support and aluminum compounds mixture. The silica catalyst support can be mixed with the one or more aluminum compounds in a water and/or alcohol solution and dried to produce the silica support and aluminum compounds mixture. Suitable alcohols can include, but are not limited to, alcohols having from 1 to 5 carbon atoms, and mixtures or combinations thereof. For example, the alcohol can be or include methanol, ethanol, propan-1-ol, propan-2-ol, and the like. Suitable aluminum compounds can include, but are not limited to, aluminum monoacetate $((HO)_2AlC_2H_3O_2)$, aluminum diacetate $(HOAl(C_2H_3O_2)_2)$, and aluminum triacetate $(Al(C_2H_3O_2)_3)$, aluminum hydroxide $(Al(OH)_3)$, aluminum tri-acetylacetonate, aluminum fluoride $(AlF_3)$, sodium hexafluoroaluminate $(Na_3AlF_6)$, or any combination thereof.

Calcination to Form the Support

The silica-alumina support or the silica support and aluminum compounds mixture can be heated (calcined) in the presence of one or more inert gases, oxidants, reducing gases, or in any order/combination thereof to produce a dried alumina-silica catalyst support. As used herein, the term "oxidant" can include, but is not limited to, air, oxygen, ultra-zero air, oxygen/inert gas mixtures, or any combination thereof. Inert gases can include, but are not limited to, nitrogen, helium, argon, or combinations thereof. Reducing gases can include, but are not limited to, hydrogen, carbon monoxide, or combinations thereof.

The silica-alumina support or the silica support and aluminum compounds mixture can be heated to a first temperature under nitrogen gas or other inert gas. After heating to the first temperature the nitrogen gas can be stopped, one or more oxidants can be introduced, and the temperature can be increased to a second temperature. For example, the silica-alumina support or the silica support and aluminum compounds mixture can be heated under an inert atmosphere to a temperature of about 200° C., the oxidant can be introduced, and the mixture can then be heated to a temperature of from about 450° C. to about 1,500° C. to produce an alumina-silica catalyst support. The second temperature can range from a low of about 250° C., about 300° C., about 400° C., or about 500° C. to a high of about 600° C., about 650° C., about 700° C., about 800° C., or about 900° C. For example, the second temperature can range from about 400° C. to about 850° C., about 800° C. to about 900° C., about 600° C. to about 850° C., or about 810° C. to about 890° C. The silica-alumina support or the silica support and aluminum compounds mixture can be heated and held at the second temperature for a period of time ranging from about 1 minute to about 100 hours. For example, the silica-alumina support or the silica support and alumina compounds mixture can be heated and held at the second temperature for a time ranging from a low of about 30 minutes, about 1 hour, or about 3 hours to a high of about 10 hours, about 20 hours, or about 50 hours. In one or more embodiments, the silica-alumina support or the silica support and alumina compounds mixture can be heated from ambient temperature to the second or upper temperature without heating to an intermediate or first temperature. The silica-alumina support or the silica support and alumina compounds mixture can be heated under a nitrogen or other inert atmosphere initially, which can be modified at an intermediate temperature to include the one or more oxidants or the atmosphere can be or include the one or more oxidants at the initial heating from ambient temperature.

Catalyst Activation

The support can be mixed, blended, contacted, or otherwise combined with one or more sources of halide ions, sulfate ions, or a combination of anions to produce an inorganic oxide catalyst support and anion mixture, which can be heated or calcined to produce an activated support. For example, one or more halide ion sources, sulfate ion sources, metal ion sources, or any combination thereof, can be dry mixed, i.e., mixed without the presence of a liquid or intentionally added liquid, with the inorganic oxide support. In another example, the one or more halide ion sources, sulfate ion sources, metal ion sources, or any combination thereof, can be wet mixed, i.e., in the presence of a liquid, with the inorganic oxide catalyst support. Illustrative liquids can include, but are not limited to, alcohols, water, or a combination thereof. Suitable alcohols can include, but are not limited to, alcohols having from 1 to 5 carbon atoms, and mixtures or combinations thereof. The mixture, either dry mixed or wet mixed, can be calcined to produce an activated support. Suitable systems for calcining are shown in FIGS. 1 and 2.

FIG. 1 is a simplified process flow diagram of a catalyst activator system 100 that may be used in embodiments. The catalyst support 102, for example, as described above, can be placed in a fluidized bed reactor 104 for the activation. The fluidized bed reactor 104 may be heated by electrical furnace heaters 106 placed over the fluidized zone 108. The upper portion 110 of the fluidized bed reactor 104 may also be heated, for example, by electrical heat tracing 112. A distribution plate 114 allows the flow of a gas from a gas feed line 116 into the bottom of the fluidized bed reactor 104. The gas from the gas feed line 116 fluidizes the bed and carries materials, such as water vapor, away from the catalyst support 102. A dump valve 118 at the bottom of the fluidized bed reactor 104 allows product to be removed directly to an inert product container 120, e.g., a tank that has been purged to remove oxygen and water and left with an inert gas.

Any number of different gases may be used during an activation procedure. For example, the system may be coupled to an air source 122 and a nitrogen source 124, among others. Valves 126 and 128 can be used to select which gas is open to the feed line 130. The feed line 130 can be divided into two lines. A first line 132 provides the gas to the bottom of the fluidized bed reactor 104 and the second line 134 provides a gas purge that can be used to blow solids from filters into the top of the fluidized bed.

The first line 132 feeds a pressure regulator 136 which sets the activation pressure. The gas flow passes through flow indicator 138 that measures the gas flow up through the fluidized bed reactor 104. From the flow indicator 138, the gas may flow through a control valve 140. A pressure safety valve 142 can be used to prevent line or vessel overpressure, for example, from failure of the pressure regulator 136 or from operations in the fluidized bed reactor 104. An electrical pre-heater 144 can be used to preheat the fluidization gas to a temperature below, at, or above the bed temperature. From the pre-heater 144, the gas feed line 116 carries the gas to the bottom of the fluidized bed reactor 104.

In the fluidized bed reactor 104, the flow of the gas up through the distributor plate 114 fluidizes the support, allowing the removal of material from the support, such as water. Further, in embodiments described herein, the flow of the gas can be used to degrade a material, such as a halide donor, allowing a reaction of the material with catalyst support particles. The rate of the gas flow versus the surface area of the bed can affect the efficiency of the activation process. Too low a flow can lead to sintering and formation of chunks from certain components. Conversely, too high a flow rate can lead to escape of halide from the bed prior to reaction with the surface of the support. Too high a flow rate can also lead to entrainment of particles from the fluidized bed 102 that can plug particle filters 146, for example, located at the top of the fluidized bed reactor 104. The filter elements in the particle filters 146 are typically nominal 3 to 20 micron ratings, sintered metal selected to withstand both the high temperatures to be encountered in the process and any corrosive agents present. However, the particle filters 146 can be ceramics, and other materials. As the activation is performed at high temperatures, the particle filters 146 will be made from a heat resistant material. In commercial fluid bed activators it is common to have 12 to 150 particle filters 146 grouped in several sets for blow back purposes.

To lower the likelihood of plugging of the particle filters 146, the second gas line 134 can provide a purge for blowing back particles. The blowback gas may be nitrogen or may be whichever gas is being used as the main fluidizing gas at any point in time. The gas in the second gas line 134 is flowed through a pressure regulator 148 that sets the pressure of the purge. A surge tank 150 holds an amount of surge to provide sufficient gas volumes for gradually or suddenly purging a set of particle filters 146. A pressure safety valve (PSV) 151 can be used to protect the surge tank from overpressures, for example, caused by failure of the pressure regulator 148. Purge valves 152 and 154 are used together with exit valves 156 and 158 to select which of the particle filters 146 are purged and which are allowing flow out of the fluidized bed reactor 104. For example, two valves 152 on lines from the surge tank 150 to particle filters 146 may be closed, while the corresponding valves 156 on lines leading from those particle filters 146 to a scrubber vessel can be open, allowing flow from the fluidized bed reactor 104 to the scrubber vessel 160. At the same time, one valve 154 on a line from the surge tank 150 to a particle filter 146 can be open, while the corresponding valve from that particle filter 146 to the scrubber 160 can be closed. As shown by arrows, this configuration would allow gas flow out of the fluidized bed reactor 104 through two particle filters 146, while providing a purge flow into the reactor through a third particle filter 146.

The scrubber 160 can be configured to remove any number of gases from the flow out of the fluidized bed reactor 104. For example, the scrubber 160 may be filled with a packed bed of variously shaped solids known to those skilled in the art above which a solution 162 of sodium hydroxide (NaOH) or potassium hydroxide (KOH) is sprayed and trickles down over the packed bed to absorb hydrogen fluoride (HF) and other acid gases. The reaction with NaOH forms the sodium salt of the acid, for example, NaF. A pump 166 recirculates the solution 162 from the bottom of the scrubber to the spray nozzle 168 above a packed bed. A drain 164 on the scrubber 160 can be used to remove the solution 162 once it is saturated. Cleansed inert or oxidant gases from the scrubber 160 can be released to the atmosphere through a vent 170.

In the embodiment shown in FIG. 1, the fluidized bed reactor 104 has a bed diameter 172 of about 1 meter (about 39 inches). In embodiments, the gas may be flowed through the reactor at a rate that is greater than about 0.08 up to at least 0.4 ft./sec superficial velocity. High rates may decrease the formation of chips, rubble, or larger debris.

FIG. 2 is a simplified process flow diagram of another catalyst activator 200 that may be used in embodiments. Like numbered items are as described with respect to FIG. 1. The fluidized bed reactor 202 in this embodiment may have a smaller bed diameter 206, for example, four inches, six inches, eight inches, or twelve inches in diameter. Other fluidized bed reactors 202 may be larger, such as 30 inches, 42 inches, or larger.

When the bed diameter 206 of the fluidized bed reactor 202 is smaller, fewer filters can be used to remove particulates from the flow line exiting the fluidized bed reactor 202. For example, two longer filters 146 can be used to filter particles from the effluent.

Further, the design of a fluidized bed activator may target a certain fluidized bed volume to meet a desired production capacity. For example, a short, squat activator with a small height to diameter ratio or a tall, narrow activator with a larger height to diameter ratio. A larger height to diameter ratio of the fluidized bed has been found to correlate with diminished rubble formation at a given gas flux in terms of ft./sec (or m./sec) gas flow upwards through the bed. In fluidized bed activator 202 in FIG. 2, the height 204 to diameter 206 ratio of the fluidized bed is larger than the height 108 to diameter 172 ratio of the fluidized bed activator 102 in FIG. 1. Accordingly, less formation of rubble may be seen in the larger height to diameter ratio bed 202. For example, the H/D ratio of the bed 102 in FIG. 1 is between about 1 and about 1.5, while the H/D ratio of the bed 202 in FIG. 2 is between about 2.3 and about 10, or about 2.5 to about 3. In other beds, the H/D may be higher, for example, up to 12, 15, or 17.

For fluid bed activators of the height to diameter ratios considered here, the distributor plate should be designed for the pressure drop through the plate to be at least 7% of the pressure drop through the fluidized bed of particles at the gas flow rates to be used in the process. This may help to ensure good gas flow through all holes in the distributor plate so the center of the bed is as well fluidized, or nearly as well fluidized, as the outside of the bed. Also, for conical distributor plates the silica alumina material low in the cone is well fluidized.

At the gas flowrates to be used in the process, the distributor plate should be designed for the pressure drop through the distributor plate to be at least 7% of the pressure drop through the fluidized bed of particles. This criterion helps ensure good gas flow through all holes in the distributor plate so the center of the bed, and the material low in the cone, is well fluidized.

As purchased, AHF particles are large and dense. Accordingly, they tend to segregate at the bottom of the fluidized bed. This segregation behavior seems associated with formation of fluorine-rich silica alumina chips and rubble in the bottom of the fluidized bed. Such chips and rubble can then interfere with good fluidization of the entire bed and with achieving uniform temperatures throughout the fluidized bed. For beds with conical distributor plates the segregated AHF particles can accumulate in the center of the cone and contribute to problems with the gas flow distribution. For example, gas will preferentially flow through the unobstructed holes through the plate that are higher on the cone, rather than through the holes in the obstructed center of the distributor plate.

To improve fluidization, the AHF compound may be ground to reduce its average particle size from about 350 microns to about 20-40 microns. This size is closer to the silica alumina support particles, which may help the AHF particles to be better fluidized and well mixed with the silica alumina support particles at the low 0.10 ft./sec fluidization gas velocity typically used while the AHF is decomposing. Further, the AHF may be mixed with the silica alumina support particles prior to charging to the fluidized bed activator so the AHF particles are well distributed at the start.

These actions may help to decrease segregation of large and heavy AHF particles at the bottom of the fluidized bed. Segregation behavior seems to be associated with formation of fluorine-rich silica alumina chips and rubble in the bottom of the fluidized bed. The segregation interferes with good fluidization of the entire bed and with achieving uniform temperatures throughout the fluidized bed. For beds with conical distributor plates the segregated AHF particles can concentrate in the center of the cone and contribute to serious gas flow distribution problems with greater flow through the higher unobstructed holes in the distributor plate versus the holes in the obstructed center of the distributor plate.

The filter surface area per unit cross-sectional area of activator vessel should be selected such that gas approach face velocity to filter element faces is on the order of about 3.1 ft./min. If approach velocity is too high, for example, 7.8 ft./min, then sintered metal vent filters are prone to frequent plugging from entrained fine particles of the silica alumina solid, leading to an increase in pressure in the activator. In units where a constant SGV is being maintained, higher activator pressure means more pounds per hour (pph) of gas must be fed, further contributing to activator pressure increases.

In some cases, the pressure may increase over a short period of time, such as about 5 to 30 seconds, creating pressure spikes. Activator vessels are typically relatively low pressure vessels due to weak metal strength at the high operating temperatures involved. Accordingly, pressure safety interlocks typically are set at 10 or 14 psig. If activator pressure rises to this level, the interlocks typically shut off the heaters, the main gas flow, and the blowback gas flow. This causes a major disruption in the batch as temperatures start dropping, the bed defluidizes, and the filters plug worse than was already the case. The risk may be decreased by providing sufficient vent filter surface area.

If the vent filters do plug, the fluidization gas velocity is substantially lowered, by a factor of 20 to 30, to sharply decrease the pressure in the vessel. While vessel pressure is low, the filter blowback system operation is resumed. The greater delta P between the blowback supply system and the lower activator pressure makes the blowback more effective and clears the filter elements. The blowback system is allowed to operate long enough to blow back all banks of filter elements at least once. Then the gas fluidization velocity is raised back up to the recommended setting in several increments to allow progressive bed expansion, rather than suddenly to avoid lifting and burping the bed back onto the filter elements.

Filter blowback systems perform better with very brief pulse mode, e.g., 0.5 to 2 second pulses per bank of filters, with high blowback gas supply pressure, at least 15 psig and up to 60 psig or higher. The blowback system may use the venturi design, such as the HyPulse GSV from Mott Corporation, Farmington, Conn., which uses a jet of fresh gas to suck filtered outlet gas into the blowback stream that blows each element back into the activator vessel. This is more effective than a blowback system using a low pressure long duration blow that either does not dislodge the filter cake as well or blows it onto other filter elements, thereby quickly plugging those other elements. A total blowback cycle time of approximately 30 seconds may be used, during which each bank of filters is blown back in sequence and blowback operation returns to the first bank.

In order to try to maximize fluorination of the silica alumina support, multiple modifications may be practiced. For example, a low fluidization gas flow may be maintained during the AHF decomposition range from 250 to 350° C. bed temperatures. To provide some margin around the measured decomposition temperature range, the low gas flow may be maintained from about 230 to about 370° C.

Since the starting silica alumina support needs only about 0.10 ft./sec fluidizing gas velocity to be well fluidized, a 0.10 ft./sec gas flow is typically practiced from ambient temperature up to 370° C. During the operation up to at least about 340° C., bed temperatures are typically quite uniform (with a maximum to minimum spread of about 4 to 6° C.). If gas flow is left at 0.10 ft./sec, the bed temperatures begin to spread apart at a bed temperature in the 340 to 370° C. range. This indicates that fluidization is deteriorating and is no longer uniform. If left at 0.10 ft./sec, this spread can grow to 50-60° C. by the time that the bed temperature reaches about 600° C. This indicates a serious nonuniformity in fluidization. To combat this, gas flow may be increased to about 0.40 ft./sec at about 370° C. This narrows the spread in bed temperatures, but does not completely eliminate the spread.

At about 370° C., the increase in gas flow from 0.1 ft./sec to 0.4 ft./sec is performed in several increments, so as to gradually expand the bed rather than to suddenly burp the compact bed up onto the vent filters, which may initiate vent filter pluggage problems. Increments of 0.05 ft./sec appear to be satisfactorily.

The bed temperature may be held at about 200° C. for 1 to 2 hours to allow moisture to be thoroughly removed. After this, the bed temperature can be ramped up to the 250° C. bed temperature where AHF decomposition is believed to begin. The bed temperature may be slowly ramped, e.g., at about 30° C. per hour, during the 250 to 350° C. bed temperature range when AHF should be decomposing. In practice, this slow ramp rate is conducted from about 230 to 370° C. to provide some margin for bed temperature variation. The slow ramping is believed to contribute to greater fluorine capture by the silica alumina in several possible ways. First, once the AHF starts decomposing, it should decompose at a slower rate than if the temperature were ramped more rapidly. So the HF and $SiF_4$ concentrations in the gas stream surrounding the particles should be lower allowing the capture reaction at the surface to more fully deplete the gas stream of fluorine compounds before the compounds reach the top of the bed and escape with the vent stream. Second, slowly ramping the bed temperature should evolve moisture more slowly from the silica surface and out of the many pores, which should give a lower water concentration in the gas in the pores and in the gas stream surrounding the particles. Since water is released as a byproduct of HF interaction with surface hydroxyls, if there is any equilibrium behavior to the HF reaction, the extent of HF capture by the surface may increase if the overall moisture concentration in the gas in the pores is low. Further, the bonding of fluorine atoms onto the silica alumina surface may be increased in comparison to the amount purged out of the vessel in the vent stream. Thirdly, ramping bed temperature slowly from about 230 to 250° C. should allow the surface moisture evolved below 250° C. to be purged to a lower concentration in the gas in the pores and surrounding the particles before the AHF begins decomposing at 250° C.

Above about 370° C., the ramp rate may be increased to 50° C. per hour. For silica alumina supports with alumina in the boehmite phase at the start, like Siral 40, it is preferred to ramp above about 370° C. at no higher than about 50° C. per hour because higher rates increase problems with vent filter pluggage. The may be caused by increased water concentration in the vent stream resulting from conversion of the boehmite alumina to gamma alumina more rapidly. For example, about 20 wt. % of the water lost in this conversion step occurs from about 400 to about 550° C. For other silica alumina supports where the alumina does not undergo a boehmite to gamma phase conversion, higher ramp rates above about 370° C. may be possible.

If the furnace setpoint is not continuously increased during ramping periods, but instead is increased in increments, small, frequent ramp increments may be used. Large incremental increases may cause sudden release of significant water and possibly organic byproducts from decomposition of the aluminum compound on the PQ Corporation supports. Such sudden releases appear to contribute to vent filter pluggage. For example, a 5° C. heater setpoint increase every 6 minutes equates to about a 50° C. per hour ramp rate and works well. Below about 230° C. the ramp rate can be at least about 50° C. per hour and possibly higher, for example, about 100 to 125° C. per hour.

Other Approaches to Decreasing Chips and Rubbles and Increasing Uniformity

Another approach to ensuring uniform distribution of the fluorine compound such as AHF is to impregnate a liquid solution of the fluorine compound in a suitable solvent into the pores of the silica alumina support in a suitably stirred blender and then drying to remove the solvent. The amount of solvent may be sufficient to form a liquid/solid slurry that is then dried to form a free flowing solid powder. Or the amount of solution of fluorine compound and solvent may be enough to just fill the internal pore volume of the silica alumina support using a technique often referred to as incipient wetness. The solution is slowly added as the solids are stirred so a mud or region with free liquid outside particles is not created that could interfere with good solution distribution. After all the solution is charged, the solid with pores full of liquid is dried to remove the solvent. The fluorine compound is left behind throughout the pores of the particles and spread across the internal and external surface area.

Another approach is to perform the fluorination and calcination in smaller portions incrementally. For example, half the fluorine compound can be charged to the activator along with all the silica alumina support. The mixture is fluidized and heated to sufficient bed temperature to fully decompose the fluorine compound. For AHF this would mean at least about 350° C. The bed temperature may be heated to the final peak temperature for calcination for the product such as 600 or 650° C. The mixture would then be cooled to ambient temperature or at least below the temperature at which the fluorine compound begins decomposing, for example, about 250° C. for AHF. The remaining charge of solid AHF powder can then be added, fluidized with the silica alumina, reheated through the AHF decomposition region as described earlier, and heated to the final peak temperature for calcination for the product, e.g., about 600 to 650° C. The intent here is to distribute the fluorine well on the support without experiencing local overconcentrations of fluorine compound that might lead to rubble or chip formation.

The approaches described, e.g., using smaller particle sizes for the fluorine compounds, impregnating the fluorine compound into the pores of the silica alumina before calcination, or performing the fluorination in multiple calcination steps are all aimed at eliminating or minimizing the formation of fluorine-rich chips or rubble. Formation of such materials causes difficulties with flowability of the product into product containers and other processing vessels and can necessitate such additional operations as inert screening to remove the large particles. Furthermore, formation of fluorine-rich chips and rubble depletes the bulk of the batch which is free flowing powder of some of its intended level of fluorine which can affect the performance of the polymerization catalyst subsequently made on the polymer support.

The mixture of the support and the one or more sources of halide ions, sulfate ions, or a combination of anions can be heated (calcined) in the presence of one or more inert gases, oxidants, reducing gases, in any order, any combination thereof, or any order/combination thereof to produce an activated support. For example, a fluorinating agent/alumina-silica support mixture can be heated to a first temperature under a nitrogen gas purge or other inert gas or combination of inert gases. After heating to the first temperature the fluidizing gas can be switched from an inert gas supply to one containing one or more oxidants, and the temperature can be increased to a second temperature. For example, the fluorinating agent/alumina-silica support mixture can be heated under an inert atmosphere to a temperature of about 200° C., the oxidant can be introduced, and the mixture can be heated to a temperature of about 600° C. or more to produce the activated support. The fluorinating agent/alumina-silica support mixture can be heated to a second temperature ranging from a low of about 250° C., about 300° C., or about 400° C. to a high of about 600° C., about 750° C., or about 900° C.

The fluorinating agent/alumina-silica support mixture can be heated and held at the second temperature for a period of time ranging from about 1 minute to about 100 hours. For example, the fluorinating agent/alumina-silica support mixture can be heated and held at the second temperature for a time ranging from a low of about 30 minutes, about 1 hour, or about 3 hours to a high of about 10 hours, about 20 hours, or about 50 hours.

The one or more halide ion sources, sulfate ion sources, and/or metal ion sources can be introduced during heating or calcining, in lieu of, or in addition to combining the halide ion sources, sulfate ion sources, and/or metal ion sources, and the support prior to heating.

The one or more halide ion sources, sulfate ion sources, and/or metal ion sources can be mixed, blended, contacted, or otherwise combined with the alumina-silica support or the silica support and aluminum compounds mixture. The combined halide ion sources, sulfate ion sources, and/or metal ion sources, alumina-silica support, or silica support and optional aluminum compounds mixture can then be heated together, rather than separately, to produce the activated support. For example, a fluoride source such as ammonium hexafluorosilicate ($(NH_4)_2SiF_6$) can be combined with the silica, alumina, or silica-alumina compounds, which can then be calcined to produce a fluorinated alumina-silica support. Any number of other silica-alumina supports may be used in the current techniques, including commercially available grades of silica-alumina supports, such as the Siral grades discussed herein.

The activated support can include, but is not limited to, brominated alumina, brominated alumina-silica, brominated silica, fluorinated alumina, fluorinated alumina-silica, fluorinated silica, fluorinated alumina-zirconia, fluorinated silica-zirconia, fluorinated-chlorinated alumina, fluorinated-chlorinated alumina-silica, chlorinated alumina, chlorinated alumina-silica, chlorinated silica, sulfated alumina, sulfated alumina-silica, sulfated silica, or any combination thereof. The support can be treated with one or more metal ions in addition to or in lieu of the one or more halide ion sources and/or sulfate ion sources. Illustrative metal ions can include, but are not limited to, copper, gallium, molybdenum, silver, tin, tungsten, vanadium, zinc, or any combination thereof.

Illustrative fluorinating or fluoriding agents can include, but are not limited to, ammonium hexafluorosilicate ($(NH_4)_2SiF_6$), fluorine ($F_2$), hydrofluoric acid (HF), ammonium fluoride ($NH_4F$), ammonium bifluoride ($NH_4HF_2$), ammonium tetrafluoroborate ($NH_4BF_4$), ammonium hexafluorophosphate ($NH_4PF_6$), ammonium heptafluorotantalate(V) ($(NH_4)_2TaF_7$), ammonium hexafluorogermanate(IV) ($(NH_4)_2GeF_6$), ammonium hexafluorotitanate(IV) ($(NH_4)_2TiF_6$), ammonium hexafluorozirconate ($(NH_4)_2ZrF_6$), aluminum fluoride ($AlF_3$), sodium hexafluoroaluminate ($Na_3AlF_6$), molybdenum(VI) fluoride ($MoF_6$), bromine pentafluoride ($BF_5$), nitrogen trifluoride ($NF_3$), difluoroamine ($NHF_2$), perfluorohexane $C_6F_{14}$, hexafluorobenzene ($C_6F_6$), fluoromethane ($CH_3F$), trifluoroethanol ($C_2H_3F_3O$), freons, derivatives thereof, or any combination thereof. Illustrative chlorinating or chloriding agents can include, but are not limited to, freons, perchlorobenzene, chloromethane, dichloromethane, chloroform, carbon tetrachloride, trichloroethanol, hydrogen chloride, chlorine, derivatives thereof, or any combination thereof. Illustrative sulfating agents can include, but are not limited to, sulfuric acid, sulfate salts such as ammonium sulfate, or any combination thereof.

Illustrative freons can include, but are not limited to, trichlorofluoromethane ($CCl_3F$), dichlorodifluoromethane ($CCl_2F_2$), chlorotrifluoromethane ($CClF_3$), chlorodifluoromethane ($CHClF_2$), dichlorofluoromethane ($CHCl_2F$), chlorofluoromethane ($CH_2ClF$), bromochlorodifluoromethane ($CBrClF_2$), 1,1,2-trichloro-1,2,2-trifluoroethane ($Cl_2FC-CClF_2$), 1,1,1-trichloro-2,2,2-trifluoroethane ($Cl_3C-CF_3$), 1,2-dichloro-1,1,2,2-tetrafluoroethane ($ClF_2C-CClF_2$), 1-chloro-1,1,2,2,2-pentafluoroethane ($ClF_2C-CF_3$), 2-chloro-1,1,1,2-tetrafluoroethane (CHFClCF$_3$), 1,1-dichloro-1-fluoroethane ($Cl_2FC-CH_3$), 1-chloro-1,1-difluoroethane ($ClF_2C-CH_3$), tetrachloro-1,2-difluoroethane ($CCl_2FCCl_2F$), tetrachloro-1, 1-difluoroethane ($CClF_2CCl_3$), 1-bromo-2-chloro-1,1,2-trifluoroethane ($CHClFCBrF_2$), 2-bromo-2-chloro-1,1,1-trifluoroethane ($CF_3CHBrCl$), 1,1-dichloro-2,2,3,3,3-pentafluoropropane ($CF_3CF_2CHCl_2$), 1,3-dichloro-1,2,2,3,3-pentafluoropropane ($CClF_2CF_2CHClF$).

The amount of the halide ion sources, sulfate ion sources, and/or metal ion sources mixed with the support can range from a low of about 0.01 wt. %, about 0.1 wt. %, or about 1 wt. % to a high of about 10 wt. %, about 20 wt. %, about 30 wt. %, about 40 wt. %, or about 50 wt. %, based on the total weight of the mixture, i.e., the support, halide ion source, sulfate ion source, and/or metal ion source. For example, a fluorinating agent in an amount of from about 0.01 g to about 0.5 g can be combined per gram of inorganic oxide catalyst support. In another example, the halide ion source can be a fluorinating agent, the support can be silica-alumina, and the amount of fluoride on the support can range from a low of about 2 wt. %, about 3 wt. %, about 3.5 wt. %, about 4 wt. %, about 4.5 wt. %, or about 5 wt. % to a high of about 8 wt. %, about 9 wt. %, about 10 wt. %, about 11 wt. %, or about 12 wt. %, based on the weight of the support. In another example, the halide ion source can be a fluorinating agent, the support can be silica, calcined in the presence of an aluminum source, and the amount of fluoride on the support can range from a low of about 1.5 wt. %, about 2 wt. %, or about 2.5 wt. % to a high of about 3.5 wt. %, about 4 wt. %, about 4.5 wt. %, or about 5 wt. %, based on the weight of the support.

The activated catalyst support can have a surface area ranging from a low of about 1 $m^2/g$, about 50 $m^2/g$, or about 100 $m^2/g$ to a high of about 400 $m^2/g$, about 500 $m^2/g$, or about 800 $m^2/g$. The activated catalyst support can have a pore volume ranging from a low of about 0.01 cm³/g, about 0.1 cm³/g, about 0.8 cm³/g, or about 1 cm³/g to a high of about 2 cm³/g, about 2.5 cm³/g, about 3 cm³/g, or about 4 cm³/g. The activated catalyst support can have an average particle size ranging from a low of about 0.1 μm, about 0.3 μm, about 0.5 μm, about 1 μm, about 5 μm, about 10 μm, or about 20 μm to a high of about 50 μm, about 100 μm, about 200 μm, or about 500 μm. The average pore size of the activated catalyst support can range from about 5 Å to about 1,000 Å. Exemplary ranges of pore sizes that can be used include about 10 Å to about 500 Å, or about 75 Å to about 350 Å.

Suitable catalyst supports are discussed and described in Hlatky, Chem. Rev. (2000), 100, 1347 1376 and Fink et al., Chem. Rev. (2000), 100, 1377 1390, U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032 and 5,770,664, and WO 95/32995, WO 95/14044, WO 96/06187, and WO 97/02297.

Co-Catalyst

As used herein, the terms "activator", when not meaning an item of process equipment, and "cocatalyst" are used interchangeably and refer to any compound or combination of compounds, supported or unsupported, which can activate a single site catalyst compound or component, such as by creating a cationic species of the catalyst component. For example, this can include the abstraction of at least one leaving group (the "X" group in the single site catalyst compounds described herein) from the metal center of the single site catalyst compound/component.

For example, the activator can include a Lewis acid or a non-coordinating ionic activator or ionizing activator, or any other compound including Lewis bases, aluminum alkyls, and/or conventional-type cocatalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as tri (n-butyl)ammonium tetrakis(pentafluorophenyl) boron, a trisperfluorophenyl boron metalloid precursor, a trisperfluoronaphthyl boron metalloid precursor, or any combinations thereof.

Aluminoxanes can be described as oligomeric aluminum compounds having —Al(R)—O— subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum such as triisobutylaluminum. MMAOs are generally more soluble in aliphatic solvents and more stable during storage. There are a variety of methods for preparing aluminoxane and modified aluminoxanes, non-limiting examples can be as discussed and described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; and 5,939,346; and EP 0 561 476; EP 0 279 586; EP 0 594-218; and EP 0 586 665; and WO Publications WO 94/10180 and WO 99/15534.

In one or more embodiments, a visually clear MAO can be used. For example, a cloudy and/or gelled aluminoxane can be filtered to produce a clear aluminoxane or clear aluminoxane can be decanted from a cloudy aluminoxane solution. In another embodiment, a cloudy and/or gelled aluminoxane can be used. Another aluminoxane can include a modified methyl aluminoxane ("MMAO") type 3A (commercially available from Akzo Chemicals, Inc. under the trade name Modified Methylaluminoxane type 3A, discussed and described in U.S. Pat. No. 5,041,584). A suitable source of MAO can be a solution having from about 1 wt. % to about a 50 wt. % MAO, for example. Commercially available MAO solutions can include the 10 wt. % and 30 wt. % MAO solutions in solvents such as toluene available from Albemarle Corporation, of Baton Rouge, La.

In at least one specific embodiment, the catalyst system can be free or substantially free from any intentionally added organo-aluminum compounds. In other words, in at least one embodiment, the use of organo-aluminum compounds can be avoided or otherwise not intentionally added to the catalyst system.

In one or more embodiments, one or more ionizing or stoichiometric activators, neutral or ionic, can be used in combination with aluminoxane or modified aluminoxane. For example, tri (n-butyl) ammonium tetrakis (pentafluorophenyl) boron, a trisperfluorophenyl boron metalloid precursor or a trisperfluoronaphthyl boron metalloid precursor, polyhalogenated heteroborane anions (WO 98/43983), boric acid (U.S. Pat. No. 5,942,459), or combinations thereof can be used. Examples of neutral stoichiometric activators can include tri-substituted boron, tellurium, aluminum, gallium, indium, or any combination thereof. The three substituent groups can each be independently selected from alkyls, alkenyls, halogens, substituted alkyls, aryls, arylhalides, alkoxy, and halides. Preferred neutral stoichiometric activators include trisperfluorophenyl boron or trisperfluoronaphthyl boron.

Catalyst Compound

The single site catalyst compound can be or include one or more metallocene catalysts and other single-site catalysts. As described herein, catalysts with multiple types of active sites can be used in the present techniques, such as bimetallic catalysts, multi-site catalysts, or mixed metallocene catalysts, among others. Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds can include "half sandwich" and/or "full sandwich" compounds having one or more Cp ligands (cyclopentadienyl and ligands isolobal to cyclopentadienyl) bound to at least one Group 3 to Group 12 metal atom, and one or more leaving groups bound to the at least one metal atom. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The Cp ligands are one or more rings or ring systems, at least a portion of which includes π-bonded systems, such as cycloalkadienyl ligands and heterocyclic analogues. The rings or ring systems typically include atoms selected from the group consisting of Groups 13 to 16 atoms, and, in a particular exemplary embodiment, the atoms that make up the Cp ligands are selected from the group consisting of carbon, nitrogen, oxygen, silicon, sulfur, phosphorus, germanium, boron, aluminum, and combinations thereof, where carbon makes up at least 50% of the ring members. In a more particular exemplary embodiment, the Cp ligands are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthrenyl, indenyl, benzindenyl, fluorenyl, octahydrofluorenyl, cyclooctatetraenyl, cyclopentacyclododecenyl, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrenyl, thiophenoindenyl, thiophenofluorenyl, hydrogenated versions thereof (e.g., 4,5,6,7-tetrahydroindenyl, or "$H_4$ Ind"), substituted versions thereof (as discussed and described in more detail below), and heterocyclic versions thereof.

The metal atom "M" of the metallocene catalyst compound can be selected from the group consisting of Groups 3 through 12 atoms and lanthanide Group atoms in one exemplary embodiment; and selected from the group consisting of Groups 3 through 10 atoms in a more particular exemplary embodiment, and selected from the group consisting of Sc, Ti, Zr, Hf, V, Nb, Ta, Mn, Re, Fe, Ru, Os, Co, Rh, Ir, and Ni in yet a more particular exemplary embodiment; and selected from the group consisting of Groups 4, 5, and 6 atoms in yet a more particular exemplary embodiment, and Ti, Zr, Hf atoms in yet a more particular exemplary embodiment, and Hf in yet a more particular exemplary embodiment. The oxidation state of the metal atom "M" can range from 0 to +7 in one exemplary embodiment; and in a more particular exemplary embodiment, can be +1, +2, +3, +4, or +5; and in yet a more particular exemplary embodiment can be +2, +3, or +4. The groups bound to the metal atom "M" are such that the compounds described below in the formulas and structures are electrically neutral, unless otherwise indicated. The Cp ligands form at least one chemical bond with the metal atom M to form the "metallocene catalyst compound." The Cp ligands are distinct from the leaving groups bound to the catalyst compound in that they are not highly susceptible to substitution/abstraction reactions.

The one or more metallocene catalyst compounds can be represented by the formula (I):

$$Cp^A Cp^B Mx_n \qquad (I)$$

where M is as described above; each X is chemically bonded to M; each Cp group is chemically bonded to M; and n is 0 or an integer from 1 to 4, and either 1 or 2 in a particular exemplary embodiment.

The ligands represented by $Cp^A$ and $Cp^B$ in formula (I) can be the same or different cyclopentadienyl ligands or ligands isolobal to cyclopentadienyl, either or both of which can contain heteroatoms and either or both of which can be substituted by a group R. In at least one specific embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) can be unsubstituted or substituted with any one or combination of substituent groups R. Non-limiting examples of substituent groups R as used in structure (I) as well as ring substituents in structures Va-d, discussed and described below, include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. More particular non-limiting examples of alkyl substituents R associated with formulas (I) through (Va-d) include methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl, hydrocarbyl substituted organometalloid radicals including trimethylsilyl, trimethylgermyl, methyldiethylsilyl, and the like, and halocarbyl-substituted organometalloid radicals, including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, as well as Group 16 radicals including methoxy, ethoxy, propoxy, phenoxy, methylsulfide and ethylsulfide. Other substituent groups R include, but are not limited to, olefins such as olefinically unsaturated substituents including vinyl-terminated ligands such as, for example, 3-butenyl, 2-propenyl, 5-hexenyl, and the like. In one exemplary embodiment, at least two R groups (two adjacent R groups in a particular exemplary embodiment) are joined to form a ring structure having from 3 to 30 atoms selected from the group consisting of carbon, nitrogen, oxygen, phosphorus, silicon, germanium, aluminum, boron, and combinations thereof. Also, a substituent group R such as 1-butanyl can form a bonding association to the element M.

Each X in the formula (I) above and for the formula/structures (II) through (Va-d) below is independently selected from the group consisting of: any leaving group, in one exemplary embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_8$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof, in a more particular exemplary embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular exemplary embodiment; hydride, chloride, fluoride, methyl, phenyl, phenoxy, benzoxy, tosyl, fluoromethyls and fluorophenyls, in yet a more particular exemplary embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls, and $C_1$ to $C_{12}$ heteroatom-containing alkylaryls, in yet a more particular exemplary embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls, in yet a more particular exemplary embodiment; fluoride, methyl, ethyl, propyl, phenyl, methylphenyl, dimethylphenyl, trimethylphenyl, fluoromethyls (mono-, diand trifluoromethyls) and fluorophenyls (mono-, di-, tri-, tetra- and pentafluorophenyls), in yet a more particular exemplary embodiment; and fluoride, in yet a more particular exemplary embodiment.

Other non-limiting examples of X groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides, halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one exemplary embodiment, two or more X's form a part of a fused ring or ring system. In at least one specific embodiment, X can be a leaving group selected from the group consisting of chloride ions, bromide ions, $C_1$ to $C_{10}$ alkyls, and $C_2$ to $C_{12}$ alkenyls, carboxylates, acetylacetonates, and alkoxides.

The metallocene catalyst compound includes those of formula (I) where $Cp^A$ and $Cp^B$ are bridged to each other by at least one bridging group, (A), such that the structure is represented by formula (II):

$$Cp^A(A)Cp^BMX_n \qquad (II)$$

These bridged compounds represented by formula (II) are known as "bridged metallocenes." The elements $Cp^A$, $Cp^B$, M, X and n in structure (II) are as defined above for formula (I); where each Cp ligand is chemically bonded to M, and (A) is chemically bonded to each Cp. The bridging group (A) can include divalent hydrocarbon groups containing at least one Group 13 to 16 atom, such as, but not limited to, at least one of a carbon, oxygen, nitrogen, silicon, aluminum, boron, germanium, tin atom, and combinations thereof; where the heteroatom can also be $C_1$ to $C_{12}$ alkyl or aryl substituted to satisfy neutral valency. In addition to the metallocene catalyst compounds discussed and described above, other suitable organometallic catalyst compounds can include, but are not limited to, the catalyst compounds discussed and described in U.S. Pat. Nos. 7,741,417; 7,179,876; 7,169,864; 7,157,531; 7,129,302; 6,995,109; 6,958,306; 6,884,748; 6,689,847; and WO Publications WO 97/22635; WO 00/699/22; WO 01/30860; WO 01/30861; WO 02/46246; WO 02/50088; WO 04/026921; and WO 06/019494.

Continuity Additive/Static Control Agent

In gas phase polyethylene production processes, as disclosed herein, it may be desirable to additionally use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the single site catalyst compounds being used. For example, the use of static control agents is disclosed in European Patent No. 0229368 and U.S. Pat. Nos. 4,803,251; 4,555,370; and 5,283,278, and references cited therein.

The continuity additives or static control agents may be added to the reactor in an amount ranging from 0.05 to 200 ppm, based on the weight of all feeds to the reactor, excluding recycle. In some embodiments, the continuity additive may be added in an amount ranging from 2 to 100 ppm, or in an amount ranging from 4 to 50 ppm.

Polymerization Process

The catalyst system can be used to polymerize one or more olefins to provide one or more polymer products therefrom. Any polymerization process including, but not limited to, high pressure, solution, slurry, and/or gas phase processes can be used. In one embodiment, a continuous gas phase process utilizing a fluidized bed reactor is used to polymerize ethylene and one or more optional comonomers to provide a polyethylene.

The term "polyethylene" refers to a polymer having at least 50 wt. % ethylene-derived units. In various embodiments, the polyethylene can have at least 70 wt. % ethylene-derived units, at least 80 wt. % ethylene-derived units, at least 90 wt. % ethylene-derived units, at least 95 wt. % ethylene-derived units, or at least 100 wt. % ethylene-derived units. The polyethylene can, thus, be a homopolymer or a copolymer, including a terpolymer, having one or more other monomeric units. As described herein, a polyethylene can include, for example, at least one or more other olefins and/or comonomers. Suitable comonomers can contain 3 to 16 carbon atoms in one embodiment; from 3 to 12 carbon atoms in another embodiment; from 4 to 10 carbon atoms in another embodiment; and from 4 to 8 carbon atoms in yet another embodiment. Illustrative comonomers include, but are not limited to, propylene, 1-butene, 1-pentene, 1-hexene, 1-heptene, 1-octene, 4-methylpent-1-ene, 1-decene, 1-dodecene, 1-hexadecene, and the like.

A suitable fluidized bed reactor can include a reaction zone and a so-called velocity reduction zone. The reaction zone can include a bed of growing polymer particles, formed polymer particles and a minor amount of catalyst particles fluidized by the continuous flow of the gaseous monomer and diluent to remove heat of polymerization through the reaction zone. Optionally, some of the re-circulated gases can be cooled and compressed to form liquids that increase the heat removal capacity of the circulating gas stream when readmitted to the reaction zone. A suitable rate of gas flow can be readily determined by simple experiment. Make-up of gaseous monomer to the circulating gas stream can be at a rate equal to the rate at which particulate polymer product and monomer associated therewith is withdrawn from the reactor and the composition of the gas passing through the reactor can be adjusted to maintain an essentially steady state gaseous composition within the reaction zone. The gas leaving the reaction zone can be passed to the velocity reduction zone where entrained particles are removed. Finer entrained particles and dust can be removed in a cyclone and/or fines filter. The gas can be passed through a heat exchanger where at least a portion of the heat of polymerization can be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The reactor temperature of the fluid bed process can range from 30° C. or 40° C. or 50° C. to 90° C. or 100° C. or 110° C. or 120° C. or 150° C. In general, the reactor temperature can be operated at the highest feasible temperature taking into account the sintering temperature of the polymer product within the reactor. Regardless of the process used to make the polyolefins the polymerization temperature, or reaction temperature should be below the melting or "sintering" temperature of the polyolefins to be formed. Thus, the upper temperature limit in one embodiment is the melting temperature of the polyolefin produced in the reactor.

Hydrogen gas can be used in olefin polymerization to control the final properties of the polyolefin, such as described in "Polypropylene Handbook," at pages 76-78 (Hanser Publishers, 1996). Using certain catalyst systems, increasing concentrations (partial pressures) of hydrogen can increase the flow index (FI) of the polyolefin generated. The flow index can thus be influenced by the hydrogen concentration. The amount of hydrogen in the polymerization can be expressed as a mole ratio relative to the total polymerizable monomer, for example, ethylene, or a blend of ethylene, butene, hexene, or propylene, among others. Any combinations of co-monomers may also be used to achieve property targets for the final resin. The amount of hydrogen used in the polymerization process can be an amount necessary to achieve the desired flow index of the final polyolefin resin. In one embodiment, the mole ratio of hydrogen to total monomer ($H_2$:monomer) can be in a range from greater than 0.0001 in one embodiment, and from greater than 0.0005 in another embodiment, and from greater than 0.001 in yet another embodiment, and less than 10 in yet another embodiment, and less than 5 in yet another embodiment, and less than 3 in yet another embodiment, and less than 0.10 in yet another embodiment, where a desirable range can include any combination of any upper mole ratio limit with any lower mole ratio limit described herein. Expressed another way, the amount of hydrogen in the reactor at any time can range to up to 5,000 ppm, and up to 4,000 ppm in another embodiment, and up to 3,000 ppm in yet another embodiment, and between 50 ppm and 5,000 ppm in yet another embodiment, and between 50 ppm and 2,000 ppm in another embodiment. The amount of hydrogen in the reactor can range from a low of about 1 ppm, about 50 ppmw, or about 100 ppm to a high of about 400 ppm, about 800 ppm, about 1,000 ppm, about 1,500 ppm, or about 2,000 ppm. In yet another embodiment, the ratio of hydrogen to total monomer ($H_2$:monomer) can be about 0.00001:1 to about 2:1, about 0.0005:1 to about 1.5:1, or about 0.0001:1 to about 1:1.

The one or more reactor pressures in a gas phase process (either single stage or two or more stages) can vary from 690 kPa (100 psig) to 3,448 kPa (500 psig), and in the range from 1,379 kPa (200 psig) to 2,759 kPa (400 psig) in another embodiment, and in the range from 1,724 kPa (250 psig) to 2,414 kPa (350 psig) in yet another embodiment.

The gas phase reactor can be capable of producing from about 10 kg of polymer per hour (22 lbs./hr) to 90,900 kg/hr (200,000 lbs./hr), and greater than 455 kg/hr (1,000 lbs./hr) in another embodiment, and greater than 4,540 kg/hr (10,000 lbs./hr) in yet another embodiment, and greater than 11,300 kg/hr (25,000 lbs./hr) in yet another embodiment, and greater than 15,900 kg/hr (35,000 lbs./hr) in yet another embodiment, and greater than 22,700 kg/hr (50,000 lbs./hr) in yet another embodiment, and from 29,000 kg/hr (65,000 lbs./hr) to 45,500 kg/hr (100,000 lbs./hr) in yet another embodiment.

A slurry polymerization process can also be used. A slurry polymerization process generally uses pressures in the range of from about 101 kPa (1 atmosphere) to about 5,070 kPa (50 atmospheres) and even greater and temperatures in the range of from about 0° C. to about 120° C., and more particularly from about 30° C. to about 100° C. In a slurry polymerization, a suspension of solid, particulate polymer can be formed in a liquid polymerization diluent medium to which ethylene and comonomers and often hydrogen along with catalyst are added. The suspension including diluent can be intermittently or continuously removed from the reactor where the volatile components are separated from the polymer and recycled, optionally after a distillation, to the reactor. The liquid diluent employed in the polymerization medium can be an alkane having from 3 to 7 carbon atoms, such as, for example, a branched alkane. The medium employed should be liquid under the conditions of polymerization and relatively inert. When a propane medium is used the process should be operated above the reaction diluent critical temperature and pressure. In one embodiment, a hexane, isopentane, or isobutane medium can be employed.

The polyethylene can have a melt index ratio ($I_{21}/I_2$) ranging from about 5 to about 300, or from about 10 to less than about 250, or, in many embodiments, from about 15 to about 200. FI ($I_{21}$) can be measured in accordance with ASTM D1238 (190° C., 21.6 kg). The MI ($I_2$) can be measured in accordance with ASTM D1238 (at 190° C., 2.16 kg weight). FI ($I_5$) can be measured in accordance with ASTM D1238 (at 190° C., 5.0 kg weight).

Density can be determined in accordance with ASTM D-792. Density is expressed as grams per cubic centimeter (g/cm$^3$) unless otherwise noted. The polyethylene can have a density ranging from a low of about 0.89 g/cm$^3$, about 0.90 g/cm$^3$, or about 0.91 g/cm$^3$ to a high of about 0.95 g/cm$^3$, about 0.96 g/cm$^3$, or about 0.97 g/cm$^3$. The polyethylene can have a bulk density, measured in accordance with ASTM D1895 method B, of from about 0.25 g/cm$^3$ to about 0.5 g/cm$^3$. For example, the bulk density of the polyethylene can range from a low of about 0.30 g/cm$^3$, about 0.32 g/cm$^3$, or about 0.33 g/cm$^3$ to a high of about 0.40 g/cm$^3$, about 0.44 g/cm$^3$, or about 0.48 g/cm$^3$.

The polyethylene can be suitable for such articles as films, fibers, nonwoven and/or woven fabrics, extruded articles, and/or molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, etc.

EXAMPLES

To provide a better understanding of the foregoing discussion, the following non-limiting examples of tests and procedure are provided. All parts, proportions, and percentages are by weight unless otherwise indicated.

Materials

Superficial Gas Velocity (SGV) is defined herein as the linear upwards velocity of fluidization gas in the activator vessel accounting for the vessel cross-sectional area in square feet and the actual temperature and pressure of the gas in the fluidized bed. The mass flowrate of gas is converted to actual cubic feet per minute using the ideal gas law and molecular weight of the gas as is well known in the art. Then the actual cubic feet per minute of fluidization gas flow is divided by 60 to get actual cubic feet per second, then divided by the cross-sectional area of the vessel to get linear feet per second of upwards gas velocity. This is also known as Superficial Gas Velocity or SGV and has units of feet per second.

Siral 40 is a raw synthetic silica alumina catalyst support in which the alumina is in the boehmite phase (AlOOH). It is sold by Sasol Germany Gmbh of Hamburg, Germany. The Sasol 40 grade in particular has about 40% silica and 60% alumina after calcination. After calcination at 550° C. for 3 hours the support has surface area of about 490 to 525 m2/g, pore volume of about 0.9 ml/g, and about 39 to 42 micron average particle size. Its settled bulk density is about 0.31 to 0.34 g/cc.

Siralox 40/480 is a dehydrated, also referred to as calcined, silica alumina catalyst support, sold by Sasol Germany Gmbh of Hamburg, Germany. It is based upon raw Siral 40 as the starting material. Siralox 40/480 has been dehydrated by the supplier at a temperature of 550° C. for three hours. The Siralox 40/480 grade has about 40% silica and 60% alumina after calcination. The alumina is in the gamma phase with the molecular formula $Al_2O_3$. After calcination the support has surface area of about 480 to 500 m2/g, pore volume of about 0.9 to 1.0 ml/g, and about 29 to 33 micron average particle size. Its settled bulk density is about 0.33 to 0.37 g/cc.

Siral 40/650 is a fluorinated (5.3% F) dehydrated silica alumina support prepared by the method of the invention. The grade with a suffix of 600 has been dehydrated at temperatures up to 600° C. for three to five hours. A grade with a suffix of 650 has been dehydrated at temperatures up to 650° C. for three to five hours. The support has settled bulk density about 0.25 g/cc.

In addition to the silica alumina supports, various grades of modified raw silica catalyst supports were used as starting materials. These were ES70W, ES70, and ES757 available from PQ Corporation of Conshohocken, Pa. All three grades were modified by the addition of compounds that generated a 5 wt. % aluminum loading after calcination at 1000° C. PQ 5% Al on ES70W has a surface area of about 249 to 290 m$^2$/g, pore volume of about 1.32 to 1.35 ml/g, and about 43 to 46 micron average particle size. PQ 5% Al on ES70 has a surface area of about 278 m$^2$/g, a pore volume of about 1.32 ml/g, and about 39 micron average particle size. PQ 5% Al on ES757 has a surface area of about 270 to 290 m2/g, pore volume of about 1.31 to 1.34 ml/g, and about 25 to 27 micron average particle size.

Ammonium hexafluorosilicate (AHF) is a commercially available dry crystalline powder compound available from KC Industries of Mulberry, Fla. This compound is believed to decompose at elevated temperatures to release ammonia, HF, and $SiF_4$, all of which are gases at elevated temperatures. The decomposition reaction seems to occur over the temperature range from 250 to 350° C. with the peak rate of decomposition occurring close to 300° C. The gaseous HF and $SiF_4$ compounds undergo further chemical reactions with the surface of the silica alumina catalyst supports to bond fluorine atoms onto the surface, probably predominantly on the aluminum atoms. The AHF compound particles are fairly large in size, ranging up to a d90 of about 500-600 microns and a d50 of about 325-360 microns, and a d10 of about 190 microns. Its settled bulk density is about 1.18 g/cc.

Preparation Procedures

In addition to the dry mixing of the support with a fluorine donor, discussed herein, a fluorinated Siral 40 was prepared using a water impregnation method. The materials used to prepare fluorinated Siral 40 using water impregnation method included 88 g ammonium hexafluorosilicate (AHF), 638 g of Siral 40, and about 642 g of de-ionized water. The stirred tank used for the preparation was cleaned, dried, and pressure tested before operation. The tank is stirred with a double helical ribbon impeller and is heated by an oil bath connected to an oil filled jacket.

Raw Siral 40 was added to the clean tank at room temperature (between about 27° C. to 30° C.) first. The tank was then stirred at low speed. The ammonium hexafluorosilicate (AHF) was pre-dissolved in 642 g of de-ionized water. Undissolved AHF and/or insoluble impurities were filtered and removed. The AHF solution was then charged to the stirred tank. The agitator speed was increased to 130 rpm and the resulting slurry was stirred at room temperature for half an hour. The material was then dried at 65° C. jacket temperature under full vacuum (about 27 inches Hg) and nitrogen purge going into the bottom of the tank. The material was dried until the material temperature was lined out for 2 hours, which occurred at about 58-60° C. The fluorinated Siral 40 was then dehydrated at 600° C. under standard procedure.

Catalyst Preparation

The materials used to prepare the catalyst included 14.26 g of bis(n-propylcyclopentadienyl)hafnium dimethyl (referred to as HfP), 843 g of 10 wt. % solution of methylaluminoxane (MAO) in toluene, 477 g of the dehydrated fluorinated Siral 40, and about 937 g of dry toluene. The stirred tank used for the supporting procedure was cleaned, dried, and pressure tested before operation. The tank is stirred with a double helical ribbon impeller and is heated by an oil bath connected to an oil filled jacket.

The methylaluminoxanes and toluene were charged to the clean tank at about room temperature, e.g., about 27° C. to 30° C. The mix tank was stirred at a low speed. The HfP was dissolved in a small amount of toluene and the solution was transferred to the stirred tank. The bottle was rinsed with dry toluene and the rinse was transferred to the tank. The stirring speed was increased to 130 rpm and the tank was stirred for 30 minutes at room temperature, about 27° C.-30° C. Dehydrated fluorinated Siral 40 was then added to the mix tank. The resulting slurry was mixed for another hour at room temperature. Drying began by increasing the bath temperature to 75° C. and reducing the pressure gradually until it reached full vacuum (about 27 inches Hg). Once the material was free flowing, a nitrogen sweep was started to continue the drying. The material was dried until the residual toluene level in the catalyst was below 3 wt. %. This occurs typically about 2 hours after the material temperature becomes steady at around 68 to 70° C. The catalyst was cooled down and discharged into a clean container and a final catalyst sample was taken. Expected yield for this batch is 575 g.

General Observations

It was unexpectedly found that a dramatic change in fluidizability of the solid support occurs during the dehydration and fluorine modification of raw silica alumina catalyst support into dehydrated fluorinated silica alumina catalyst support. Specifically, it was determined that only 0.10 ft./sec fluidizing gas velocity is needed to fluidize well the raw silica alumina support. However, the dehydrated fluorinated silica alumina catalyst support needs 0.35 to 0.40 ft./sec fluidizing gas velocity to be well fluidized.

The change in fluidizability may in part be inherent in silica alumina. For instance, the alumina in some raw silica alumina supports exists in the boehmite phase and loses about 20 wt. % as water during the conversion to the gamma phase of alumina while heating to high temperatures such as 550 to 650° C. Changes in particle shape and properties caused by this significant weight loss may contribute in part to the different fluidizability of the dehydrated product versus the raw silica alumina support. Another contributor to the change in fluidizability may be the fluorine modification of the silica alumina surface being performed during dehydration of the silica alumina support.

TABLE 1

Bed Expansion Test Results for Raw Siral 40

| SGV (ft/sec) | Bed Height (inches) | Bed Expansion % | (Fluidized) Bulk Density (g/cc) | Observations |
|---|---|---|---|---|
| 0.00 | 3.50 | 0 | 0.336 | Resting. Settled bulk density. |
| 0.03 | 4.63 | 32 | 0.254 | Channeling, not fluidized. |
| 0.05 | 5.00 | 43 | 0.235 | Channeling, not fluidized. |
| 0.07 | 5.88 | 68 | 0.200 | Channeling, not fluidized. |
| 0.10 | 6.50 | 86 | 0.181 | Nice fluidization. |
| 0.12 | 7.25 | 107 | 0.162 | Nice fluidization. |

TABLE 1-continued

Bed Expansion Test Results for Raw Siral 40

| SGV (ft/sec) | Bed Height (inches) | Bed Expansion % | (Fluidized) Bulk Density (g/cc) | Observations |
|---|---|---|---|---|
| 0.15 | 7.75 | 121 | 0.152 | Nice fluidization. |
| 0.20 | 8.50 | 143 | 0.138 | Nice fluidization. Moderate elutriation. |

Figure 3:
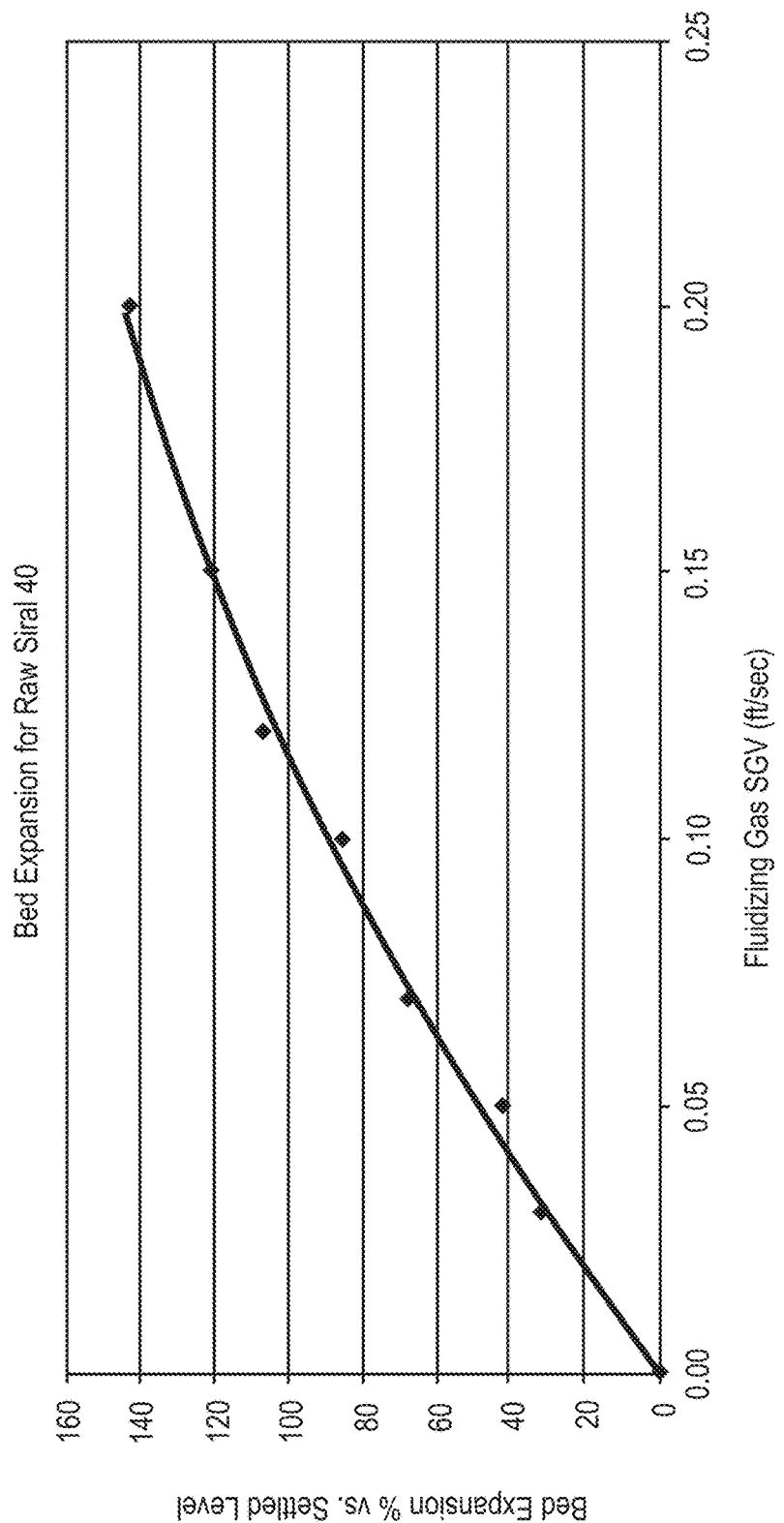
FIG. 3 is a plot showing the bed expansion of raw Siral 40 versus the flow of the fluidizing gas (SGV)

As shown in Table 1, raw silica alumina Siral 40 support is well fluidized with only 0.10 ft./sec fluidization gas velocity. FIG. 3 is a plot 300 showing the bed expansion of raw Siral 40 versus the flow of the fluidizing gas (SGV).

Figure 4:
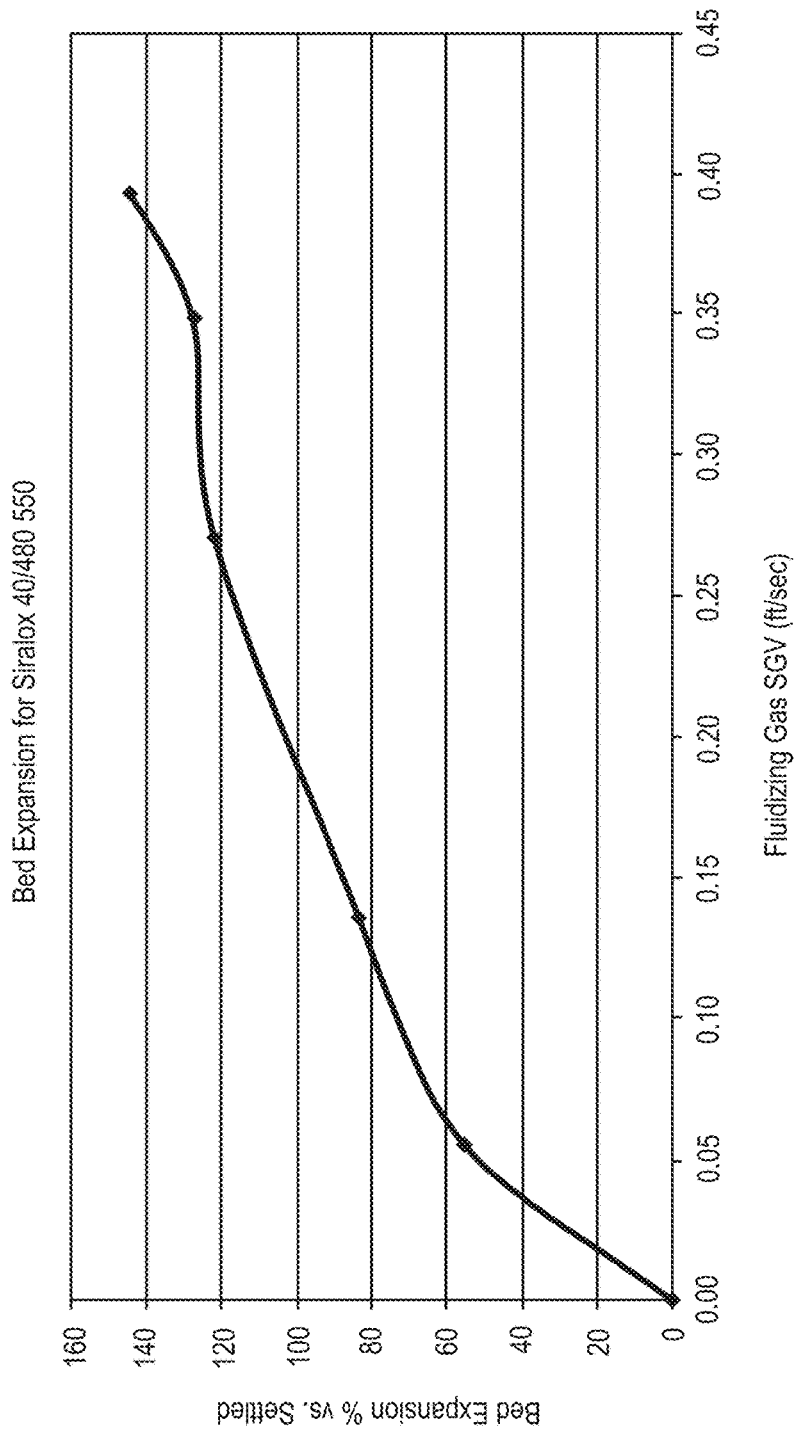
FIG. 4 is a plot showing the bed expansion of Siralox 40/480 that was calcined by the supplier at 550° C. for three hours versus the SGV.

In contrast, as shown in Table 2, dehydrated Siralox 40/480 silica alumina support needs about 0.35 ft./sec fluidization gas velocity to be well fluidized. FIG. 4 is a plot 400 showing the bed expansion of Siralox 40/480 that was calcined by the supplier at 550° C. for three hours versus the SGV.

TABLE 2

Bed Expansion Test Results for Supplier-Calcined Siralox 40/480

| SGV (ft/sec) | Bed Height (inches) | Bed Expansion % | (Fluidized) Bulk Density (g/cc) | Observations |
|---|---|---|---|---|
| 0.00 | 4.50 | 0 | 0.366 | Resting bed height. Settled bulk density. |
| 0.055 | 7.00 | 56 | 0.235 | Sub-fluidized. Solids mixing, but areas exist where there is significant channeling and resistance to stirring. Minor elutriation. |
| 0.135 | 8.25 | 83 | 0.200 | Sub-fluidized, will defluidize/channel over time. Solids mix, but there is significant channeling and resistance to stirring. Minor elutriation. |
| 0.270 | 10.00 | 122 | 0.165 | Incipient fluidization. Bed takes 1-2 minutes to fully expand and fluidize, little/no resistance. Minor/moderate elutriation. Small spikes. |
| 0.348 | 10.25 | 128 | 0.161 | Operating velocity. Well fluidized with fast mixing. May take a minute to fluidize fully. Moderate elutriation. |
| 0.392 | 11.00 | 144 | 0.150 | Well fluidized. Very rapid mixing. Moderate elutriation. |

Figure 5:
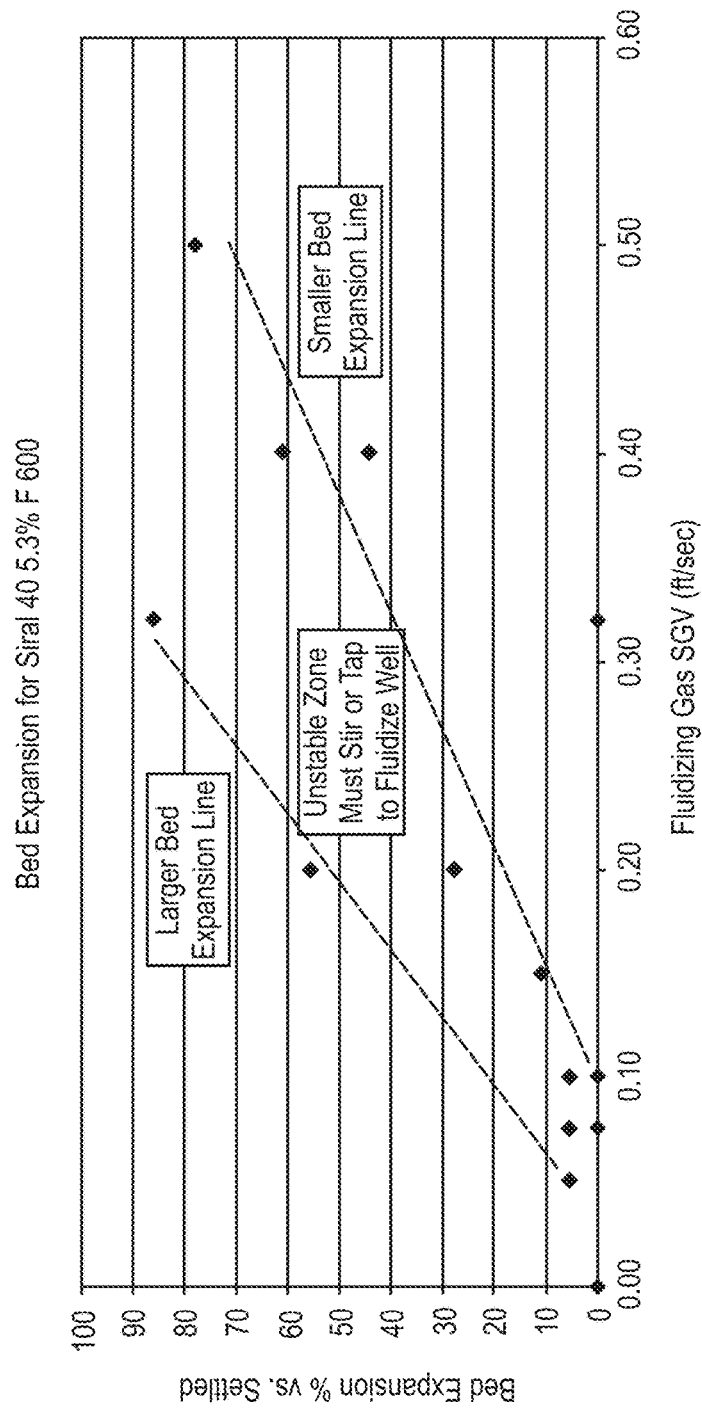
FIG. 5 is a plot showing the bed expansion for a Siral 40 containing about 5.3% fluorine after calcining at 600° C.

Further, as shown in Table 3, fluorinated dehydrated Siral 40 silica alumina support needs about 0.40 ft./sec fluidization gas velocity to be well fluidized. FIG. 5 is a plot 500 showing the bed expansion for a Siral 40 containing about 5.3% fluorine after calcining at 600° C.

TABLE 3

Bed Expansion Test Results for Activated Siral 40 5.3% F 600.

| SGV (ft/sec) | Bed Height (inches) | Bed Expansion % | (Fluidized) Bulk Density (g/cc) | Observations |
|---|---|---|---|---|
| 0.00 | 4.50 | 0 | 0.249 | Resting. Settled bulk density. |
| 0.05 | 4.75 | 6 | 0.236 | Channeling, not fluidized. |
| 0.08 | 4.5-4.75 | 3 | 0.242 | Channeling, not fluidized. |
| 0.10 | 4.5-4.75 | 3 | 0.242 | Channeling, not fluidized. |
| 0.15 | 5.00 | 11 | 0.224 | More channels and more vigorous spouting. |
| 0.20 | 5.75-7 | 28-56 | 0.160-0.195 | Channeling until tapped or stirred. Then pretty good fluidization, but over 2 minutes settled back down from 7" to 5.75". |
| 0.32 | 4.5-8.375 | 0-86 | 0.134-0.249 | Rathole until tapped, then fluidized to 8.375" but over 5 minutes settled back down to 4.5". |
| 0.40 | 6.5-7.25 | 44-61 | 0.155-0.172 | Pretty well fluidized. 7.25" dropped down to 6.5" over 3 minutes. Satisfactory. |

TABLE 3-continued

Bed Expansion Test Results for Activated Siral 40 5.3% F 600.

| SGV (ft/sec) | Bed Height (inches) | Bed Expansion % | (Fluidized) Bulk Density (g/cc) | Observations |
|---|---|---|---|---|
| 0.50 | 8.00 | 78 | 0.140 | Nice fluidization. Vigorous bubbling. Nearly stable bed ht. Lots of elutriation. |

Thus, in order to efficiently and effectively calcine and fluorinate silica alumina catalyst supports, it may be useful to conduct the calcination following certain equipment design and operating parameters either individually or in combination with one another. For example, different activators have different geometrical configurations. This is best described by the differences in the ratio of H/D, as well as other parameters shown in Table 4.

TABLE 4

Examples of Activator Equipment and Activation Profiles

| | Example 1 Activator Unit 1 Activator Profile 1 | Example 2 Activator Unit 2 Activator Profile 2 | Example 3 Activator Unit 2 Activator Profile 3 | Example 4 Activator Unit 3 Activator Profile 4 | Example 5 Activator Unit 3 Activator Profile 5 |
|---|---|---|---|---|---|
| Bed Diameter (in) | 5.3125 | 14 | 14 | 40 | 40 |
| Cross-Sectional Area (ft2) | 0.154 | 1.07 | 1.07 | 8.73 | 8.73 |
| Bed Height (in) | 15 | 28 | 28 | 48 | 48 |
| Height/Diameter Ratio | 2.8 | 2.0 | 2.0 | 1.2 | 1.2 |
| Plate Cone Angle from Horizontal | 60° | ~15° | ~15° | 45° | 45° |
| Vent Filter Area (ft2) | 0.262 | 0.982 | 0.982 | 26.7 | 66.8 |
| Highest Filter Approach Velocity (ft./min) | 3.53 | 6.53 | 18.29 | 4.51 | 3.14 |
| Blowback Scheme | continuous alternating | continuous alternating | continuous alternating | pulse alternating | pulse alternating |
| Freeboard Heating | no | no | no | yes | yes |
| Distributor Plate Design | perforated plate | screwplate | screwplate | screwplate | screwplate |
| Distributor Plate Pressure Drop (psid) at 0.1 ft./sec SGV | 0.076 | | | 0.004 | 0.004 |
| Fluid Bed Pressure Drop (psid) at 0.1 ft./sec SGV | 0.110 | 0.177 | 0.149 | 0.358 | 0.358 |
| Distributor Plate Pressure Drop (psid) as % of Bed Pressure Drop (psid) at 0.1 ft./sec SGV | 69 | | | 1.1 | 1.1 |
| Product Agglomeration | fine powder, no chips or rubble | 0.5 to 2% chips up to ~1-inch size | 0.5 to 2% chips up to ~1-inch size | ~2% chips up to 1.5-inch size | ~3% 0.25-inch up to 5-inch chips and rubble |
| Support Type | Siral 40 | Siral 40 | PQ ES70W with Al | Siral 40 | Siral 40 |
| Support Charge Weight (lbs.) | 2.205 | 25.12 | 21.67 | 405.25 | 399.0 |
| AHF Charge Weight (lbs.) | 0.243 | 2.11 | 1.20 | 44.5 | 50.5 |
| AHF Premixed | yes | no | yes | no | yes |
| Product Yield (lbs.) | 2.186 | 22.5 | 19.5 | 339 | 346 |
| Point of Switching to Air | end 200° C. hold | end 200° C. hold | end 200° C. hold | end 200° C. hold | end 200° C. hold |
| 1st Ramp Rate (° C./hr) | 50 | 55 | 58 | 62 | 30 |
| 1st Hold Temperature (° C.) | 200 | 200 | 200 | 200 | 200 |
| 1st Hold Time (hr) | 2 | 2 | 2 | 2 | 2 |
| 2nd Ramp Rate (° C./hr) | 50 | 54-66 | 58 | 63 | 34 |
| 2nd Hold Temperature (° C.) | 600 | 650 | 614 | 650 | 650 |
| 2nd Hold Time (hr) | 3 | 3 | 3 | 5 | 5 |
| 1st Gas Flowrate as SGV (ft./sec) | 0.10 | 0.10 | 0.10 | 0.10 | 0.1 |
| 1st Gas Flowrate Temperature Range (° C.) | 25 to 600 | 25 to 650 | 25 to 451 | 25 to 340 | 25 to 369 |
| 2nd Gas Flowrate as SGV (ft./sec) | | | 0.28 | 0.23 | 0.40 |
| 2nd Gas Flowrate Temperature Range (° C.) | | | 451 to 614 | 340 to 650 | 369 to 650 |
| Spread in Bed Temperatures at Low SGV (° C.) | 33 | 59 | 52 | <3 | 3 to 9 |
| Bed Temperature Range for Low SGV Spread (° C.) | 600 | 370 to 600 | 350 to 460 | 25 to 370 | 25 to 370 |
| Low SGV for Bed Temperature Spread (ft./sec) | 0.10 | 0.10 | 0.10 | 0.10 | 0.10 |

TABLE 4-continued

Examples of Activator Equipment and Activation Profiles

|  | Example 1<br>Activator<br>Unit 1<br>Activator<br>Profile 1 | Example 2<br>Activator<br>Unit 2<br>Activator<br>Profile 2 | Example 3<br>Activator<br>Unit 2<br>Activator<br>Profile 3 | Example 4<br>Activator<br>Unit 3<br>Activator<br>Profile 4 | Example 5<br>Activator<br>Unit 3<br>Activator<br>Profile 5 |
|---|---|---|---|---|---|
| Spread in Bed Temperatures at High SGV (° C.) |  |  | 27 | 10 avg., 23 typ. | 17 avg., 29 typ. |
| Bed Temperature Range for High SGV Spread (° C.) |  |  | 460 to 614 | 370 to 650 | 470 to 650 |
| High SGV for Bed Temperature Spread (ft./sec) |  |  | 0.28 | 0.23 | 0.40 |
| Number of Bed Pressure Spikes >9 psig | 0 | 0 | 11 | 11 | 0 |

Example 5 in Table 4 shows the practice of keeping SGV low (0.10 ft./sec) until the AHF decomposes, then raising SGV to 0.40 ft./sec to try to fluidize the final product. It also shows the practice of ramping slowly at 30-60° C./hr. The screwplate refers to a design for distributor plates discussed in U.S. Pat. No. 4,068,389. In this design, the holes in the distributor plate are tapped for machine threads and fitted with screws. The threads are shaved off on one side of the screw to provide a gas passage up to the tooth washer between the plate and the screw head. Compared with a perforated distributor plate with open holes, the screwplate may give a higher pressure drop and more uniform gas flow. But the hole area must be satisfactorily low for the gas flow being used in order for either design to be effective.

The information in Table 4 indicates that the temperature spread in the activator bed may be reduced by higher SGV gas flow. Pressure spikes, as discussed herein, are sudden increases in activator pressure caused by plugging of the filter elements in the vent filter. Pressure spikes may be decreased or eliminated by having sufficient vent filter surface area, such that gas approach face velocity to filter element faces is on the order of about 3.1 ft./min or less.

Table 4 also provides other examples of conditions that may be useful for fluorinating a support. For example, as shown in Example 1, an H/D>1.2 may reduce the formation of chips and rubble and an H/D>2.0 may provide further improvement. The Distributor Plate Pressure Drop (psid) as % of Bed Pressure Drop (psid) at 0.1 ft./sec SGV indicates that this ratio may need to be >7% for good gas distribution through a conical distributor plate to provide uniform fluidization of the bed, especially when large heavy particles, which can segregate, are involved.

However, previous studies by Derek Geldart have indicated that the target criterion for plate DP/bed DP for stable fluid bed operation is not a set figure. Geldart's work shows it to be a function of bed height over diameter. Thus, the criterion is 30% for shallow flat beds of around 0.2 to 0.3 H/D. For beds with higher H/D, e.g., 1.2, 2.0, and 2.8, the plate DP/bed DP criteria would be closer to 7.8%, 5.4%, and 4.3% respectively. This correlation applies to flat distributor plates. For conical distributor plates, a higher plate DP/bed DP ratio, may work better.

Figure 6:
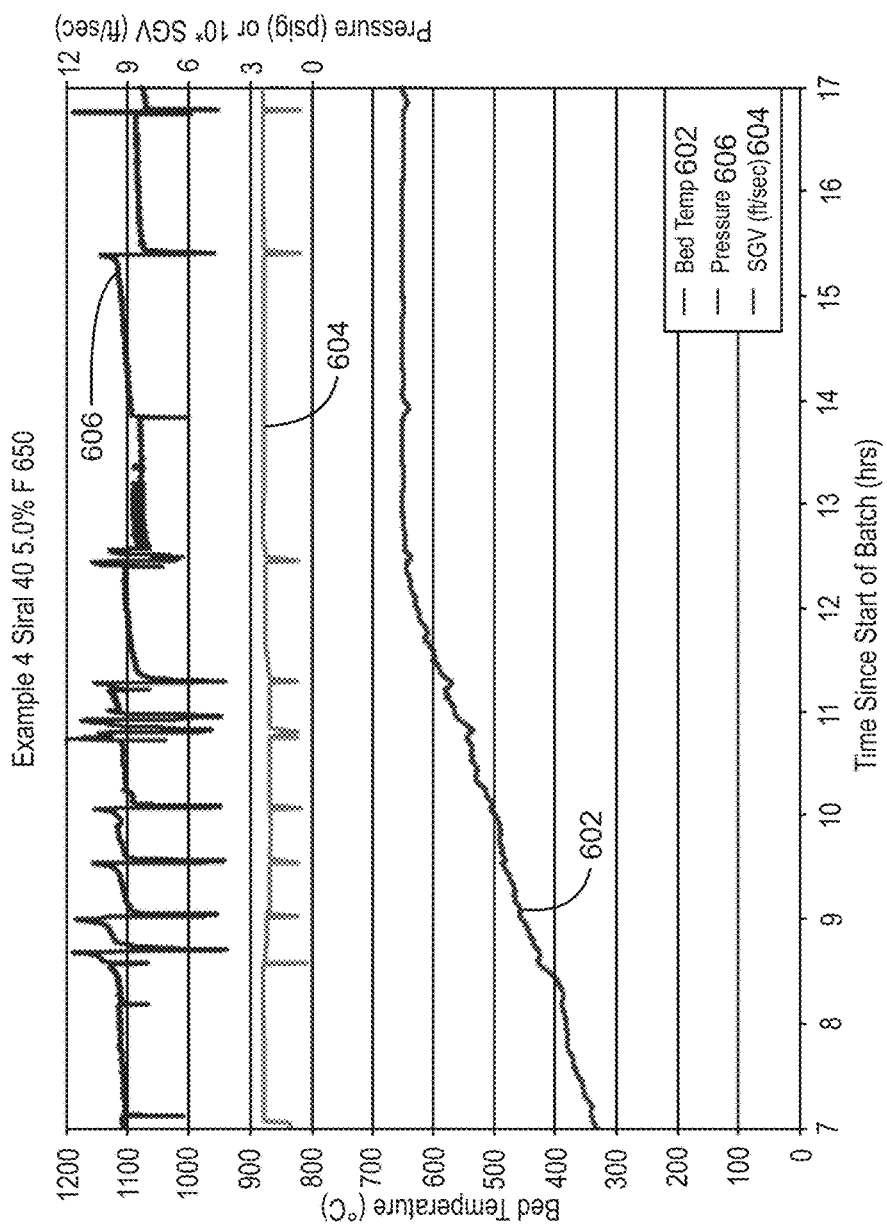
FIG. 6 shows plots, labeled Example 4, of operating parameters of a reactor with a limited filter surface area, which restricted the maximum SGV fluidization gas that could be fed to about 0.23 ft./sec.
Figure 7:
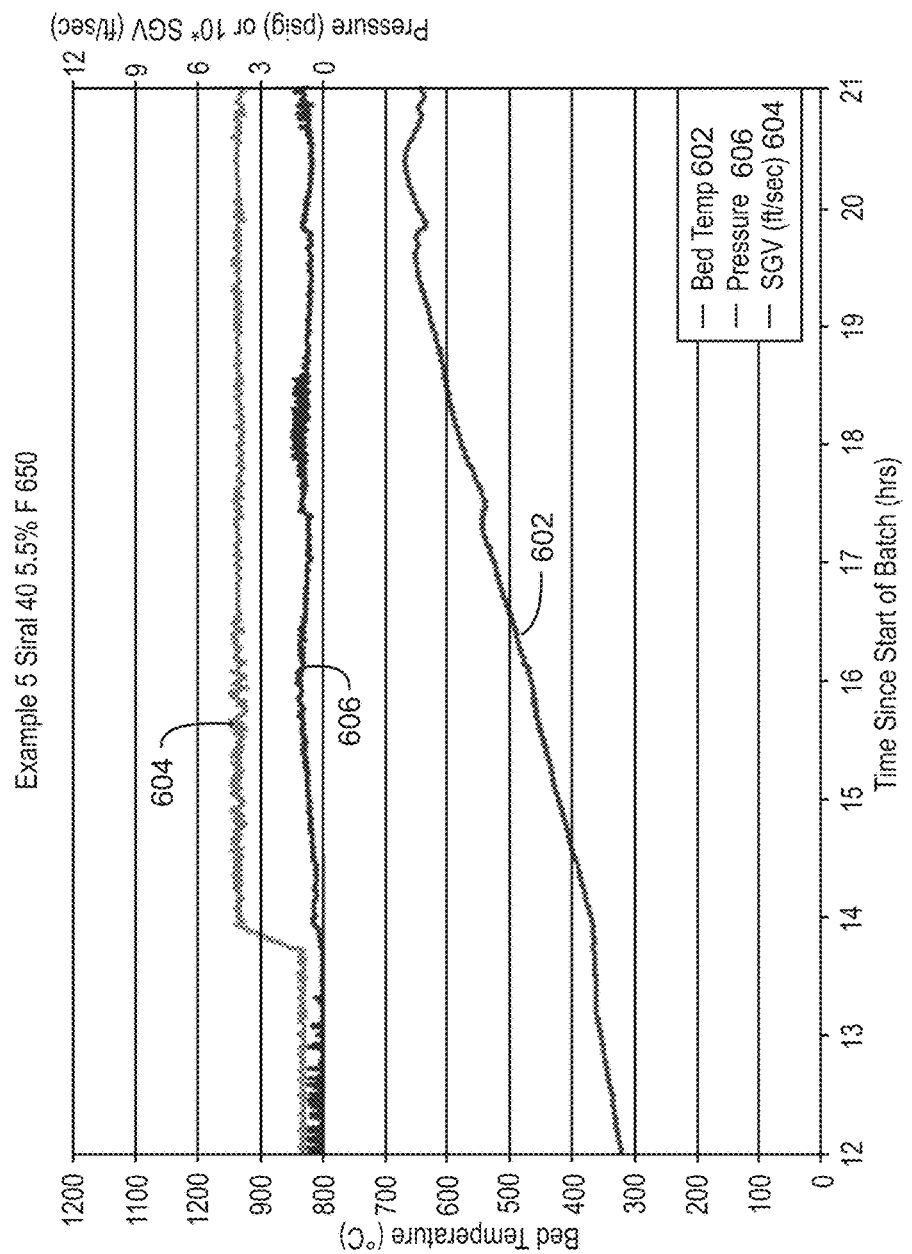
FIG. 7 shows plots, labeled as Example 5, of operating parameters of a reactor with a filter surface area that was 2.5 times higher than that in FIG. 6, which did not restrict the maximum flow of the SGV fluidization gas below the desired target of 0.40 ft./sec.

FIGS. 6 and 7 show two examples of fluorinating and dehydrating Siral 40. FIG. 6 shows plots 600, labeled Example 4, of operating parameters of a reactor with a limited filter surface area, which restricted the maximum SGV fluidization gas that could be fed to about 0.23 ft./sec. At higher feed rates, filter pluggage problems occurred. The vent filter approach face velocity at 0.23 ft./sec SGV in the main vessel was about 9.0 ft. per sec per square foot of filter area. The early part of the batch up to a temperature 602 of about 340° C. was conducted at 0.10 ft./sec. At about 7 hours into the run, the SGV 604 was raised to about 0.23 ft./sec, after which vent filter pluggages began and plagued the operation. Pressure 606 would repeatedly climb high above 10 psig, often approaching 12 psig. This prompted operator intervention to lower SGV 604 by a factor of 20 to 30 to lower the activator pressure which allowed the blowback system to clear the filters. The drop in SGV 604 defluidized the bed. Bed temperatures and their spreads often changed before and after these defluidizations in ways that were not always consistent. Smooth operation of the activation process was greatly disrupted by those pressure spikes and their consequences.

FIG. 7 shows plots 700, labeled as Example 5, of operating parameters of a reactor with a filter surface area that was 2.5 times higher than that in FIG. 6, which did not restrict the maximum flow of the SGV fluidization gas below the desired target of 0.40 ft./sec. Like numbered items are the same as shown in FIG. 6. The vent filter approach face velocity at 0.40 ft./sec SGV 604 in the main vessel was about 3.13 ft. per sec per square foot of filter area. The early part of the batch up to about 370° C. was conducted at 0.10 ft./sec. Then SGV 604 was raised in 0.05 ft./sec increments over about two minutes per increment to 0.40 ft./sec. The pressure 606 shows that no vent filter pluggages occurred providing a smooth operation. Pressure 606 was stable and did not climb above 1.6 psig.

In tests for a low H/D reactor, a higher SGV reduced bed T spread (e.g., in Example 5 discussed), but did not stop rubble formation. This may be caused by too low plate DP/bed DP ratio combined with segregated heavy AHF particles. Accordingly, finer particle size AHF may work better, especially when design parameters of the fluid bed activator are less than optimum.

Table 5 provides the fluorine loading in chips and rubble vs. loose powder for several of the activation examples in Table 4. This demonstrates how the formation of chips and rubble is correlated with high loadings of F on the chips and rubble vs. the loose powder. Also, note how the Example 1 activator with larger H/D and plate DP/bed DP formed no chips or chunks in 13 runs. Furthermore, note how the average wt % F in powder from the activator in Example 1 is higher than that in powder from the activator in Example 4 and similar runs using the same recipe (AHF: Siral 40). So the F is more concentrated in the chips and rubble than in the powder and lowers the average wt % F in the powder below the aim. In the activation of Example 5, by increasing the AHF charge proportionately by 15%, it was possible to get the F in the powder up into the same range as in the Example 1 activator, but again the chips and rubble have significantly higher levels of F than the loose powder. It is less economical to have to use larger AHF charges to achieve the same wt. % F loading on the powder.

TABLE 5

Fluorine Concentration in Chips and Rubble

| | wt % F | | |
|---|---|---|---|
| Product from Example # | in loose powder | in small chips | in chunks, typically about 3 inches |
| Example 1 and similar runs | 6.10 average of 13 runs | none made | none made |
| Example 4 and similar runs | 4.90, 5.43, 4.94 | 19.8, 23.0 | 14.4 |
| Example 5 | 6.25 | 14.1 | 12.0, 13.9, 18.7, 25.7, 26.9 |

Note:
15% more AHF was charged per lb Siral 40 in Example 5 vs. Example 4 and Example 1.

Figure 8:
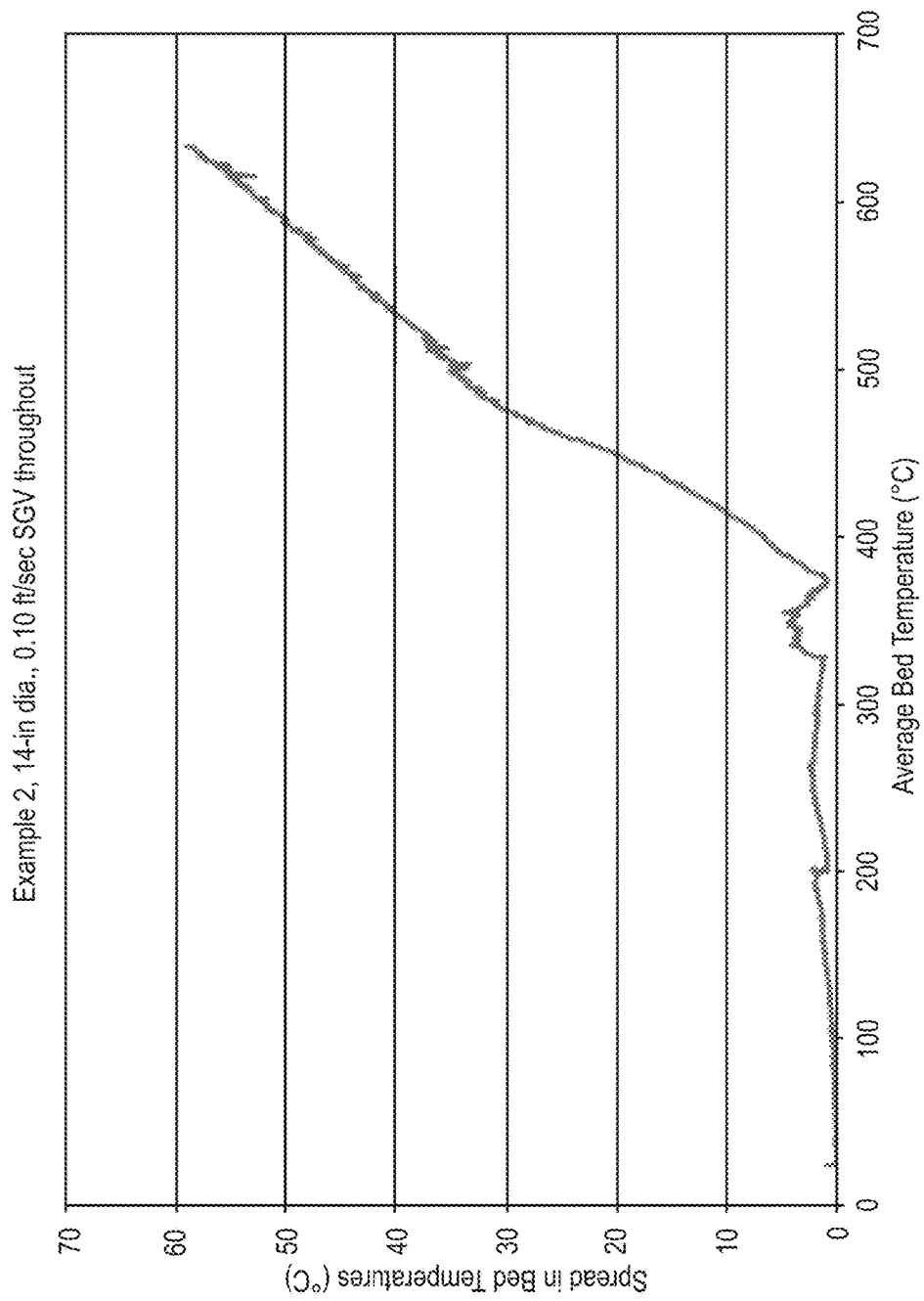
FIG. 8, labeled Example 2, is a plot of bed temperature spread which was measured in a 14-inch diameter fluidized bed activator that utilized 0.10 ft./sec throughout the run.

FIGS. 8-10 show the variation in bed temperature spread with fluidization gas SGV in ft./sec. FIG. 8, labeled Example 2, is a plot 800 of bed temperature spread which was measured in a 14-inch diameter fluidized bed activator that utilized 0.10 ft./sec throughout the run. In the plot 800, it can be seen that once the bed temperatures reached about 370° C., the fluidization behavior changed and the spread in bed temperatures steadily climbed to as high as 59° C., as bed temperature climbed to 600° C. By 370° C. substantial dehydration of the support has occurred and much free and chemically bound water has been removed. Also, by 370° C. the fluorination of the support surface has taken place when the AHF decomposed. As the temperature rises, the conversion of alumina in the boehmite form to gamma form proceeds gradually and the spread in bed temperature continues to rise.

FIG. 9, labeled Example 4, is a plot 900 of bed temperature spread which was measured in a 40-inch diameter fluidized bed activator that utilized 0.10 ft./sec fluidization gas velocity SGV in the early part of the run. At about 370° C. the fluidization gas velocity was increased to 0.23 ft./sec. It can be seen that the spread in bed temperatures was limited by the higher SGV to about 10° C. on average and a maximum of about 23° C. This was much more uniform than the 59° C. spread in Example 2 which was conducted at 0.10 ft./sec.

FIG. 10, labeled Example 5, is a plot 1000 of bed temperature spread which was measured in a 40-inch diameter fluidized bed activator that utilized 0.10 ft./sec fluidization gas velocity SGV in the early part of the run, then up to 0.40 ft./sec. SGV. At about 370° C. the fluidization gas velocity SGV was raised in 0.05 ft./sec increments over about two minutes per increment to 0.40 ft./sec. It can be seen that the spread in bed temperatures was limited by the higher SGV to about 17° C. on average and a maximum of about 29° C. This was much more uniform than the 59° C. spread in Example 2 which was conducted at 0.10 ft./sec.

Polymerization Examples

The supports described herein were used to produce catalysts in the general manner described earlier under Catalyst Preparation, using the hafnium catalyst, HfP, discussed herein. These catalysts were then utilized to produce polymer samples to determine the efficacy of supports produced using the current techniques. Table 6 provides Examples 6 through 9 of polymerizations performed in a 14-inch diameter gas phase fluidized bed pilot plant reactor using catalysts made from the subject supports and the operating conditions shown in the table. The catalysts were made from the fluorinated supports discussed in Examples 1 through 4. ICPES refers to Inductively Coupled Plasma Emission Spectroscopy analysis for metals content.

TABLE 6

Pilot Plant Polymerization Examples

| | Example 6 | Example 7 | Example 8 | Example 9 |
|---|---|---|---|---|
| SUPPORT | | | | |
| From Example # | 1 | 2 | 3 | 4 |
| F (wt. % in activated support) | 6.27 | 4.39 | 2.43 | 4.90 |
| CATALYST | | | | |
| MAO aim (mmole/g support) | 4.7 | 6.25 | 3.0 | 4.7 |
| Al (wt. %) (from MAO + support) | 33.5 | 31.0 | 10.4 | 31.9 |
| Hf (wt. %) | 1.18 | 1.07 | 0.76 | 1.03 |
| REACTION CONDITIONS | | | | |
| RX Pressure (psig) | 348.3 | 348.4 | 348.5 | 348.0 |
| Rxn. Temperature (° C.) | 78.0 | 76.0 | 77.0 | 77.0 |
| Rxtr. Inlet Gas Temperature (° C.) | 72.0 | 70.8 | 72.5 | 68.7 |
| C2 Partial Pressure (psia) | 220 | 220 | 220 | 220 |
| H2/C2 Conc. Ratio (ppm/m %) | 4.70 | 5.20 | 4.81 | 4.75 |
| C6/C2 Conc. Ratio (mole/mole) | 0.0137 | 0.0147 | 0.0143 | 0.0132 |
| Isopentane (mole %) | 7.33 | 7.86 | 8.08 | 4.36 |
| Gas Velocity (ft./sec) | 2.28 | 2.19 | 2.18 | 1.97 |
| Prod Rate (lbs./hr) | 41.00 | 39.33 | 33.00 | 44.30 |
| STY (lb./hr/ft^3) | 7.32 | 7.40 | 6.18 | 8.00 |
| Residence Time (hrs.) | 2.48 | 2.46 | 2.90 | 2.32 |

TABLE 6-continued

Pilot Plant Polymerization Examples

|  | Example 6 | Example 7 | Example 8 | Example 9 |
|---|---|---|---|---|
| Bed Weight (lbs.) | 102 | 97 | 96 | 103 |
| Fluid Bulk Density (lb./ft3) | 18.2 | 18.3 | 18.0 | 18.6 |
| Continuity Additive Conc. (ppmw prod) | 19.3 | 25.7 | 30.7 | 34.7 |
| PRODUCT PROPERTIES | | | | |
| Melt Index I2 (dg/min) | 0.909 | 0.916 | 0.795 | 1.055 |
| Melt Index I5 (dg/min) | 2.530 | 2.665 | 2.257 | 2.947 |
| Flow Index I21 (dg/min) | 22.49 | 26.51 | 21.36 | 25.48 |
| MFR I21/I2 | 24.7 | 28.9 | 26.9 | 24.16 |
| MFR I21/I5 | 8.87 | 9.95 | 9.47 | 8.65 |
| Density (g/cc) | 0.9173 | 0.9185 | 0.9186 | 0.9168 |
| Bulk Density (lb./ft^3) | 27.08 | 27.02 | 26.96 | 25.40 |
| Screen Average Particle Size (in) | 0.0468 | 0.0478 | 0.0386 | 0.0490 |
| CATALYST PRODUCTIVITY | | | | |
| Catalyst Productivity (Hf ICPES) | 20,629 | 13,836 | 10,000 | 10,729 |

While the foregoing is directed to embodiments of the present invention, other and further embodiments of the invention can be devised without departing from the basic scope thereof, and the scope thereof is determined by the claims that follow.

What is claimed is:

1. A method for making a fluorinated catalyst support, comprising:
    forming a mixture of a support material and a first portion of a fluoride donor, where the support material is an inorganic oxide;
    adding the mixture to a fluidized bed reactor;
    fluidizing the mixture in the fluidized bed reactor with a fluidizing gas at a flow rate that forms a fluidized bed with a height to diameter ratio of at least about 2.3; and
    calcining the mixture to decompose the fluoride donor and fluorinate the support material thereby forming a partially fluorided support, and
    adding a second portion of the fluoride donor to the partially fluorided support;
    calcining the second portion of the fluoride donor to the partially fluorided support to form the fluorinated catalyst support.

2. The method of claim 1, comprising maintaining a ratio of a pressure drop across a distributor plate to a pressure drop across the fluidized bed of greater than about 7%.

3. The method of claim 1, comprising maintaining the flow rate of the fluidizing gas at about 0.1 ft./sec at a temperature less than about 370° C.

4. The method of claim 1, comprising increasing the flow rate of the fluidizing gas from about 0.1 ft./sec. to about 0.4 ft./sec starting at a temperature of between about 350° C. and about 370° C.

5. The method of claim 1, comprising maintaining a filter face velocity of less than about 4 ft./sec.

6. The method of claim 1, wherein the fluoride donor comprises ammonium hexafluorosilicate, ammonium bifluoride, ammonium tetrafluoroborate, or any combination thereof.

7. The method of claim 1, wherein said forming the mixture comprises impregnating the support material with the fluoride donor by:
    dissolving the fluoride donor in a solvent;
    treating the support material with the fluoride donor to form an impregnated support material; and
    drying the impregnated support material.

8. The method of claim 1, comprising:
    combining a metallocene catalyst compound and an aluminoxane to produce a first mixture; and
    adding the fluorinated catalyst support to the first mixture and drying to produce a catalyst system.

9. The method of claim 1, comprising forming a catalyst system by combining a metallocene catalyst compound with the fluorinated catalyst support, and an aluminoxane, wherein the aluminoxane is present in an amount of about 10 mmol or less per gram of the fluorinated catalyst support.

* * * * *